United States Patent
Otsuki et al.

(10) Patent No.: US 12,495,191 B2
(45) Date of Patent: Dec. 9, 2025

(54) IMAGING DEVICE AND ELECTRONIC EQUIPMENT

(71) Applicant: Sony Semiconductor Solutions Corporation, Kanagawa (JP)

(72) Inventors: Seichi Otsuki, Kanagawa (JP); Shigeki Nakamura, Saitama (JP); Yoshikuni Nomura, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 198 days.

(21) Appl. No.: 18/263,662

(22) PCT Filed: Feb. 18, 2022

(86) PCT No.: PCT/JP2022/006793
§ 371 (c)(1),
(2) Date: Jul. 31, 2023

(87) PCT Pub. No.: WO2022/190826
PCT Pub. Date: Sep. 15, 2022

(65) Prior Publication Data
US 2024/0089567 A1 Mar. 14, 2024

Related U.S. Application Data

(60) Provisional application No. 63/158,447, filed on Mar. 9, 2021.

(51) Int. Cl.
*H04N 23/10* (2023.01)

(52) U.S. Cl.
CPC ................................. *H04N 23/10* (2023.01)

(58) Field of Classification Search
CPC ...................................................... H04N 23/10
USPC ..................................................... 348/207.99
See application file for complete search history.

(56) References Cited

FOREIGN PATENT DOCUMENTS

| JP | 2007251393 A | 9/2007 |
|----|--------------|--------|
| JP | 2008227697 A | 9/2008 |
| JP | 2019080245 A | 5/2019 |
| WO | 2018179671 A1 | 10/2018 |
| WO | 2019026619 A1 | 2/2019 |

OTHER PUBLICATIONS

International Search Report (PCT/ISA/210), International Application No. PCT/JP2022/006793, dated Apr. 19, 2022.

*Primary Examiner* — Joel W Fosselman
(74) *Attorney, Agent, or Firm* — Michael Best & Friedrich LLP

(57) ABSTRACT

There is provided an imaging device including a pixel array unit (300) configured by arraying, in a row direction and a column direction, a plurality of pixels (304) of five or more types in which wavelength bands of detectable light are different in stages. The plurality of pixels are arrayed such that, at points having any spatial phases on the pixel array unit, mixed spectral characteristics obtained by mixing spectral characteristics of a predetermined number of pixels around the points are substantially same.

20 Claims, 11 Drawing Sheets

IMAGING DEVICE AND ELECTRONIC EQUIPMENT

FIELD

The present disclosure relates to an imaging device and electronic equipment.

BACKGROUND

Most of generally used imaging devices are RGB cameras (visible light cameras) and can detect, as three RGB primary colors, light having a wide range of wavelength. However, with the RGB cameras, it is difficult to grasp a subtle color difference invisible to human eyes. Therefore, in order to accurately detect and reproduce colors of a subject, a multispectral camera capable of finely dividing and detecting the wavelength of light, in other words, having high resolution is sometimes used.

CITATION LIST

Patent Literature

Patent Literature 1: JP 2007-251393 A

SUMMARY

Technical Problem

However, in the multispectral camera of related art, it may be difficult to obtain a color image having desired luminance and spectral spatial resolution.

Therefore, the present disclosure proposes an imaging device and electronic equipment capable of obtaining a color image having high resolution.

Solution to Problem

According to the present disclosure, there is provided an imaging device including: a pixel array unit configured by arraying, in a row direction and a column direction, a plurality of pixels of five or more types in which wavelength bands of detectable light are different in stages. In the imaging device, the plurality of pixels are arrayed such that, at points having any spatial phases on the pixel array unit, mixed spectral characteristics obtained by mixing spectral characteristics of a predetermined number of pixels around the points are substantially same.

Furthermore, according to the present disclosure, there is provided Electronic equipment on which an imaging device is mounted. The imaging device includes a pixel array unit configured by arraying, in a row direction and a column direction, a plurality of pixels of five or more types in which wavelength bands of detectable light are different in stages. In the imaging device, the plurality of pixels are arrayed such that, at points having any spatial phases on the pixel array unit, mixed spectral characteristics obtained by mixing spectral characteristics of a predetermined number of pixels around the points are substantially same.

DESCRIPTION OF EMBODIMENTS

Figure 1:
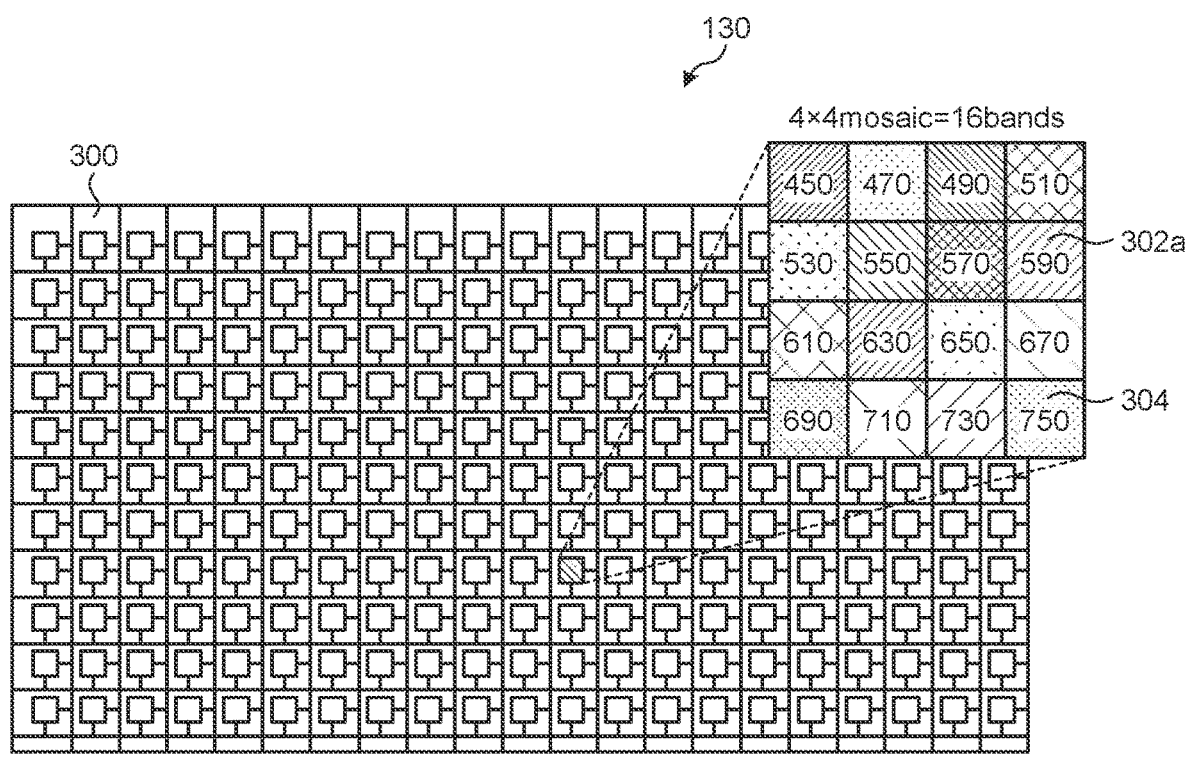
FIG. 1 is an explanatory diagram illustrating a planar configuration example of an image sensor 130 according to a comparative example.

Preferred embodiments of the present disclosure are explained in detail below with reference to the accompanying drawings. Note that, in the present specification and the drawings, components having substantially the same functional configurations are denoted by the same reference numerals and signs, whereby redundant explanation of the components is omitted. In addition, in the present specification and the drawings, a plurality of components having substantially the same or similar functional configurations are sometimes distinguished by attaching different alphabets after the same reference numerals. However, when it is not particularly necessary to distinguish each of the plurality of components having substantially the same or similar functional configurations, only the same reference numerals and signs are attached.

The drawings referred to in the following explanation are drawings for facilitating the explanation and understanding of an embodiment of the present disclosure. In order to clearly show the drawings, shapes, dimensions, ratios, and the like illustrated in the drawings are sometimes different from actual ones. Further, an imaging device illustrated in the drawings can be changed in design as appropriate in consideration of the following explanation and publicly known techniques. In the explanation using a sectional view of the imaging device, the up-down direction of a sectional structure of the imaging device corresponds to a relative direction in the case in which a light receiving surface that light made incident on the imaging device enters is assumed to be at the top and is sometimes different from the up-down direction conforming to the actual gravitational acceleration.

Further, in the following explanation, "electrically connect" means connecting a plurality of elements directly or indirectly via other elements.

Note that the explanation is made in the following order.
1. Background leading to creation of embodiments of present disclosure
2. First Embodiment
2.1 Overview of a system configuration
2.2 Detailed configuration of a camera
2.3 Detailed configuration of an image sensor
2.4 Equivalent circuit of a pixel
2.5 Sectional configuration of the pixel
2.6 Pixel array
2.7 Configuration of a signal processing unit
2.8 Configuration of an image processing apparatus
2.9 Image processing
3. Second Embodiment
4. Summary
5. Application Examples
5.1 Use
5.2 Application Example to an unmanned flying object
6. Example of a hardware configuration
7. Supplement In the following explanation, "spectral characteristic" means detection sensitivity of pixels mounted on an image sensor to light having wavelengths. Further, "mixed spectral characteristic" means, in a predetermined plurality of pixels present in positions adjacent to one another on a light receiving surface (a pixel array unit) of the image sensor, a sum or an average value of "spectral characteristics" obtained by mixing the "spectral characteristics" of the pixels.

Furthermore, in the light receiving surface (the pixel array unit) of the image sensor according to the embodiment of the present disclosure, a plurality of types of pixels that detect light in wavelength bands are arranged such that a predetermined pattern (unit) repeats. In the following explanation, the "spatial phase" means that, when the pattern (the unit) is set as one cycle, a relative position with respect to the pattern is represented as a position within the cycle.

1. Background Leading to Creation of Embodiments of the Present Disclosure

First, before details of embodiments of the present disclosure are explained, a background of creation of the embodiments of the present disclosure by the inventor is explained. FIG. 1 is an explanatory diagram illustrating a planar configuration example of an image sensor 130 according to a comparative example used in a multispectral camera. Note that, here, the comparative example means the image sensor 130 that the inventor studied before devising the embodiment of the present disclosure. In FIG. 1, a light receiving surface (a pixel array unit) 300 of the image sensor 130 and an enlarged diagram of units 302a arrayed in a matrix (in the row direction and the column direction) on the light receiving surface 300 are illustrated. Furthermore, it is assumed that numbers shown on pixels 304 of the units 302a indicate median wavelengths of wavelength bands of light detectable by the pixels 304. It is assumed that the pixels 304 can detect light in wavelength bands having substantially the same width.

As explained above, most of generally used imaging devices are RGB cameras and can detect, as three RGB primary colors, light having a wide range of wavelengths. However, with the RGB cameras, it is difficult to grasp a subtle color difference invisible to human eyes. There is a limit in accurately detecting and reproducing colors of a subject. In such a case, in order to accurately detect the colors of the subject, it is conceivable to use a multispectral camera capable of finely dividing and detecting wavelengths of light, in other words, having high resolution.

In the present specification, the multispectral camera refers to, for example, a camera capable of detecting light (multiple spectra) in five or more wavelength bands (five or more bands), which are more than three conventional wavelength bands (three bands) of (R) red, (G) green, and (B) blue or (Y) yellow, (M) magenta, and (C) cyan based on three primary colors or color-matching functions of colors. More specifically, in an example of the image sensor 130 illustrated in FIG. 1, the image sensor 130 is an image sensor for a multispectral camera that can detect light in sixteen wavelength bands. In other words, the example illustrated in FIG. 1 is the image sensor 130 configured from sixteen types of pixels 304 that detect light in wavelength bands different from one another.

Incidentally, in the image sensor 130, since each of the pixels 304 can detect only light in any one wavelength band, each of the pixels 304 can obtain only information concerning a color in one wavelength band. Therefore, a color image is generated by complementing color information of one pixel 304 using pixel signals from the other pixels 304 that are adjacent to the one pixel 304 and can detect light in different wavelength bands. This makes it possible to obtain a color image having high luminance and spectral spatial resolution. Such processing is called demosaic processing.

However, when the inventor performed intensive studies about an image sensor for a multispectral camera, it was found that, in the multispectral camera, since light in five or more wavelength bands is detected, because of an array of the pixels 304 on the light receiving surface (the pixel array unit) 300, it is sometimes difficult to obtain a color image having desired luminance and desired spectral spatial resolution even if the demosaic processing is performed.

Here, the light receiving surface (the pixel array unit) 300 of the image sensor 130 according to the comparative example is configured by arraying a plurality of units 302a in the column direction and the row direction. It is assumed that the unit 302a is configured by sixteen pixels 304 in 4 rows and 4 columns illustrated in FIG. 1 and the sixteen pixels 304 detect light in wavelength bands different from one another. Further, in the comparative example, as illustrated in FIG. 1, the array of the pixels 304 in the unit 302a is arranged in the order of wavelengths of light to be detected. In such a case, it can be considered that the pixels 304 that detect long-wavelength light in the unit 302a are deviated to the lower side in the drawing. Then, because of such deviation, in other words, since different types of pixels 304 are not uniformly arranged in the entire unit 302a, even if the demosaic processing is performed, since color information of the pixels 304 can be complemented by only color information having deviation, it is difficult to obtain a color image having desired luminance and desired spectral spatial resolution.

Therefore, in view of such a situation, the present inventor created the embodiments of the present disclosure explained below focusing on a planar array of the pixels 304 of the image sensor 130 for a multispectral camera capable of detecting light in five or more wavelength bands.

Figure 2:
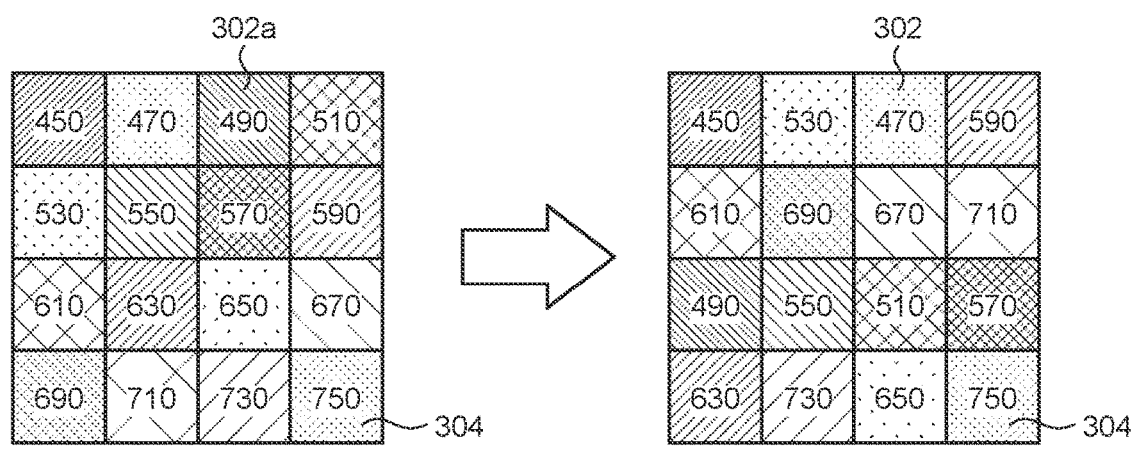
FIG. 2 is an explanatory diagram for describing an overview of a first embodiment of the present disclosure.

Next, an overview of an embodiment of the present disclosure created by the present inventor is explained with reference to FIG. 2. FIG. 2 is an explanatory diagram for explaining an overview in a first embodiment of the present disclosure. Specifically, the units 302*a* of a comparative example are illustrated on the left side of FIG. 2 and the units 302 of the present embodiment are illustrated on the right side of FIG. 2. Note that it is assumed that numbers shown on the pixels 304 of the units 302 and 302*a* in FIG. 2 indicate wavelengths of median values of wavelength bands of light detectable by the pixels 304 and it is assumed that the pixels 304 can detect light in the wavelength bands having substantially the same width.

As illustrated on the left side of FIG. 2, in the unit 302*a* of the image sensor 130 according to the comparative example, as explained above, the pixels 304 that detect light having long wavelengths are deviated to the lower side in the figure. On the other hand, in the unit 302 of the image sensor 130 according to the present embodiment created by the present inventor, the pixels 304 are not arranged in the order of wavelengths of light to be detected. Therefore, the pixels 304 that detect light having long wavelengths do not deviate to the lower side and the pixels 304 of different types are uniformly arranged in the entire unit 302. Consequently, in the present embodiment, in the demosaic processing, color information of the pixels 304 can be complemented with information concerning colors having no close wavelength, in other words, the color information of the pixels 304 can be complemented with color information without deviation. Therefore, it is possible to obtain a color image having desired luminance and desired spectral spatial resolution.

In the present embodiment, since the unit 302 is repeated on the light receiving surface (the pixel array unit) 300 of the image sensor 130, a relative position of any point in the unit 302 can be represented by a spatial phase using the unit 302 as one cycle. Therefore, in the present embodiment, at points having any spatial phase on the light receiving surface 300, it can be considered that different types of pixels 304 are arrayed such that mixed spectral characteristics obtained by mixing spectral characteristics of the pixels 304 around the point are uniform (substantially the same).

More specifically, in the example illustrated on the right side of FIG. 2, the unit 302 includes sixteen types of pixels 304 that detect light in sixteen types of wavelength bands that are different in stages. In this example, in the unit 302, the pixels 304 that detect light in wavelength bands not adjacent to one another are arranged to be adjacent to one another in the row direction and the column direction and the pixels 304 that detect light in wavelength bands adjacent to one another are arranged not to be adjacent to one another in the row direction and the column direction.

With the image sensor 130 according to the present embodiment having such an array, since light having wavelengths is uniformly detected by regions of the light receiving surface (the pixel array unit) 300 of the image sensor 130, in the demosaic processing, it is possible to complement color information of the pixels 304 with information concerning colors having no close wavelength. Therefore, in the present embodiment, since the color information of the pixels 304 can be complemented with color information without deviation, it is possible to obtain a color image having high luminance and high spectral spatial resolution. In the present embodiment, since the pixels 304 are not arranged in the order of wavelengths of detectable light unlike in the comparative example, the pixels 304 are less easily affected by light from the adjacent pixels 304. Therefore, occurrence of color mixing can be suppressed.

Note that, in the present disclosure, an embodiment concerning the array of the pixels 304 explained above, an embodiment concerning processing of a pixel signal obtained by the image sensor 130 having the light receiving surface (the pixel array unit) 300 having such an array, and applications of these embodiments are explained. In the present embodiment, it is possible to obtain a color image having high luminance and high spectral spatial resolution. Further, it is possible to use a color image having high resolution in various applications. Such embodiments of the present disclosure are sequentially explained below.

2. First Embodiment

2.1 Overview of a System Configuration

Figure 3:
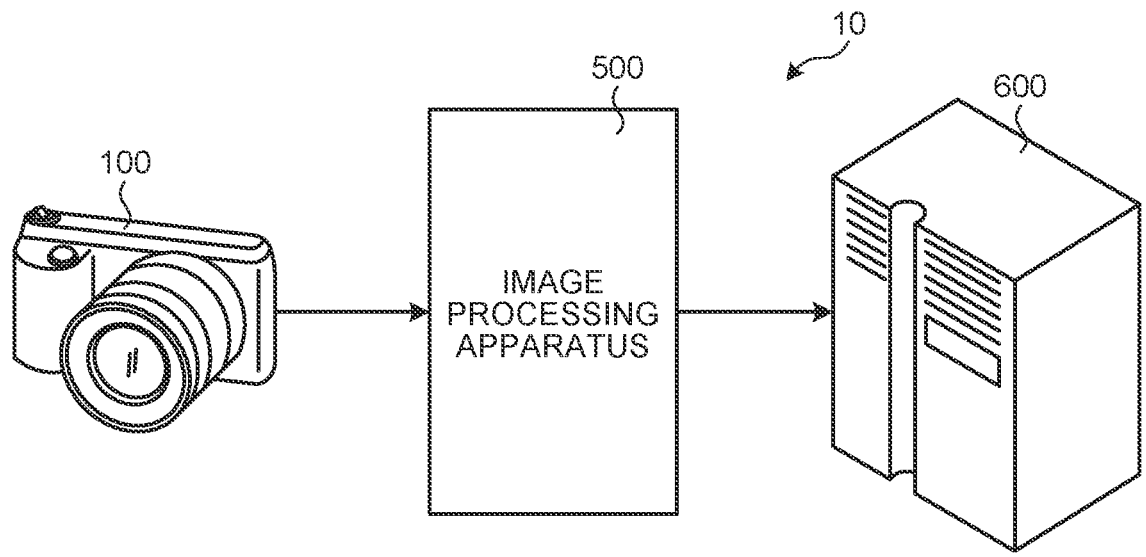
FIG. 3 is a system diagram illustrating a schematic configuration of an image processing system 10 according to the first embodiment of the present disclosure.

First, an example of a configuration of an image processing system 10 according to a first embodiment of the present disclosure is explained with reference to FIG. 3. FIG. 3 is a system diagram illustrating a schematic configuration of the image processing system 10 according to the first embodiment of the present disclosure.

As illustrated in FIG. 3, the image processing system 10 according to the present embodiment can mainly include, for example, a camera 100, an image processing apparatus 500, and a server 600, which are communicably connected to one another via a network (not illustrated). Specifically, the camera 100, the image processing apparatus 500, and the server 600 are connected to the network via, for example, a not-illustrated base station or the like (for example, a base station of a cellular phone or an access point of a wireless LAN (Local Area network)). Note that, as a communication scheme used in the network, any scheme can be applied irrespective of a wired or wireless scheme (for example, WiFi (registered trademark) or Bluetooth (registered trademark)). However, it is desirable to use a communication scheme that can maintain a stable operation. An overview of the apparatuses included in the image processing system 10 according to the present embodiment is explained below.

(Camera 100)

The camera 100 includes the image sensor 130 including the light receiving surface (the pixel array unit) 300 explained above and can image a subject and output an image obtained by the imaging to the image processing apparatus 500. Note that a detailed configuration of the camera 100 is explained below.

(Image Processing Apparatus 500)

The image processing apparatus 500 can perform various kinds of processing on the image acquired from the camera 100 explained above and can output data obtained by the processing to the server 600 explained below. For example, the image processing apparatus 500 can be hardware such as a desktop PC (Personal Computer), a laptop PC, a tablet PC, a smartphone, or a cellular phone. Further, a part of functions of the image processing apparatus 500 may be executed by the camera 100 explained above. Note that details of the image processing apparatus 500 are explained below.

(Server 600)

The server 600 can accumulate and analyze data obtained from the image processing apparatus 500 and distribute a result of the analysis and the like. The server 600 can be configured by, for example, a computer.

Note that, in FIG. 3, the image processing system 10 according to the present embodiment is illustrated as including one camera 100, the image processing apparatus 500, and the server 600 but is not limited to this in the present embodiment. For example, the image processing system 10 according to the present embodiment may include a plurality of cameras 100 or may not include the server 600.

2.2 Detailed Configuration of the Camera

Figure 4:
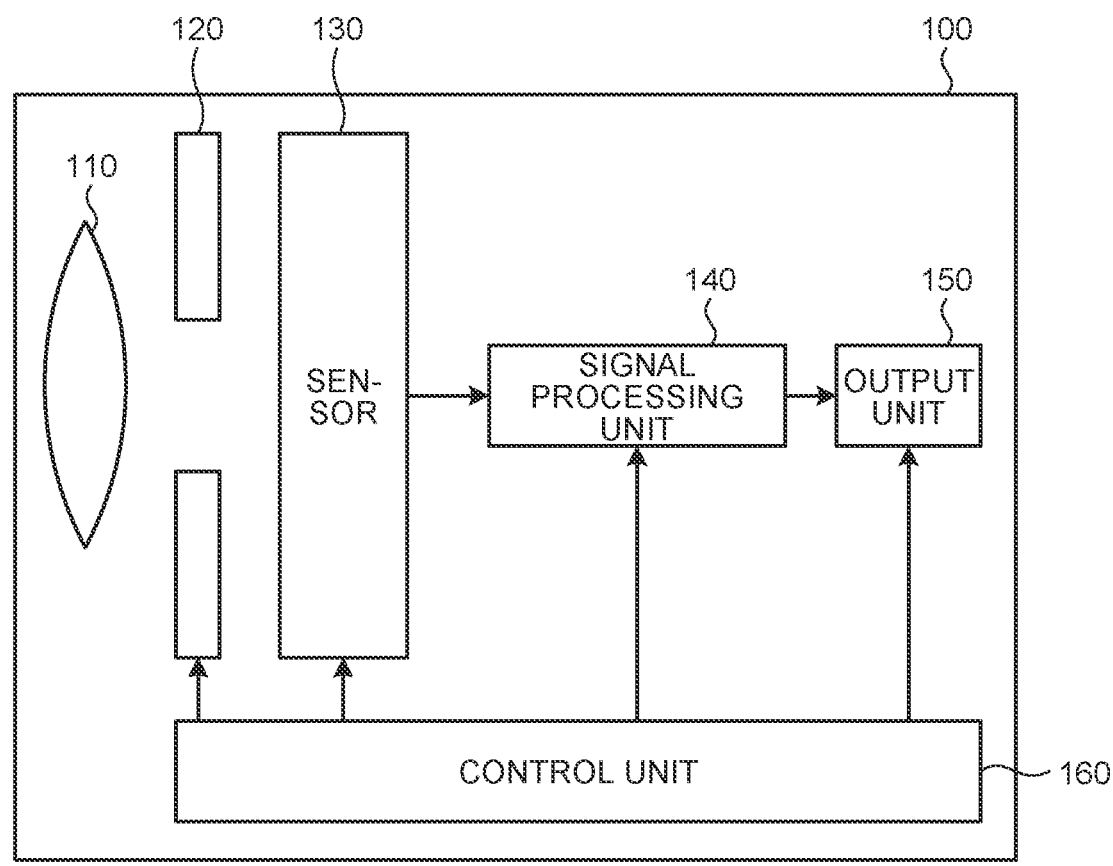
FIG. 4 is an explanatory diagram illustrating an example of a functional configuration of a camera 100 according to the first embodiment of the present disclosure.

Next, an example of a configuration of the camera 100 is explained with reference to FIG. 4. FIG. 4 is an explanatory diagram illustrating an example of a functional configuration of the camera 100 according to the first embodiment of the present disclosure.

As illustrated in FIG. 4, the camera 100 mainly includes an optical lens 110, a shutter mechanism 120, an image sensor 130, a signal processing unit 140, an output unit 150, and a control unit 160. The elements included in the camera 100 are sequentially explained below.

(Optical Lens 110)

The optical lens 110 can form an image of image light (incident light) from a subject on the light receiving surface (the pixel array unit) 300 of the image sensor 130 explained below. Consequently, charges are generated in the pixels 304 of the image sensor 130 and extracted as pixel signals.

(Shutter Mechanism 120)

The shutter mechanism 120 can control a light irradiation period and a light blocking period on the image sensor 130 by opening and closing.

(Image Sensor 130)

The image sensor 130 can receive image light (incident light) from a subject, generate a charge, and output a pixel signal based on the generated charge to the signal processing unit 140 explained below. Note that a detailed configuration of the image sensor 130 is explained below.

(Signal Processing Unit 140)

The signal processing unit 140 is configured from various electronic circuits, acquires pixel signals from the pixels 304 of the image sensor 130, and performs various kinds of signal processing on the acquired pixel signals to generate image data. Further, the signal processing unit 140 can output the generated image data to the output unit 150. Note that a functional configuration of the signal processing unit 140 is explained below.

(Output Unit 150)

The output unit 150 can output the image data obtained from the signal processing unit 140 explained above to, for example, the image processing apparatus 500, a storage medium (not illustrated) such as a memory, and a display device (not illustrated).

(Control Unit 160)

The control unit 160 can supply drive signals for controlling a transfer operation of a pixel signal of the image sensor 130, a shutter operation of the shutter mechanism 120, and the like to the image sensor 130, the shutter mechanism 120, and the like. For example, the image sensor 130 performs signal transfer based on the drive signal (a timing signal) supplied from the control unit 160.

Note that, in the present embodiment, the configuration of the camera 100 is not limited to the configuration illustrated in FIG. 4 and the camera 100 may be, for example, an apparatus integrated with the image processing apparatus 500.

2.3 Detailed Configuration of the Image Sensor

Figure 5:
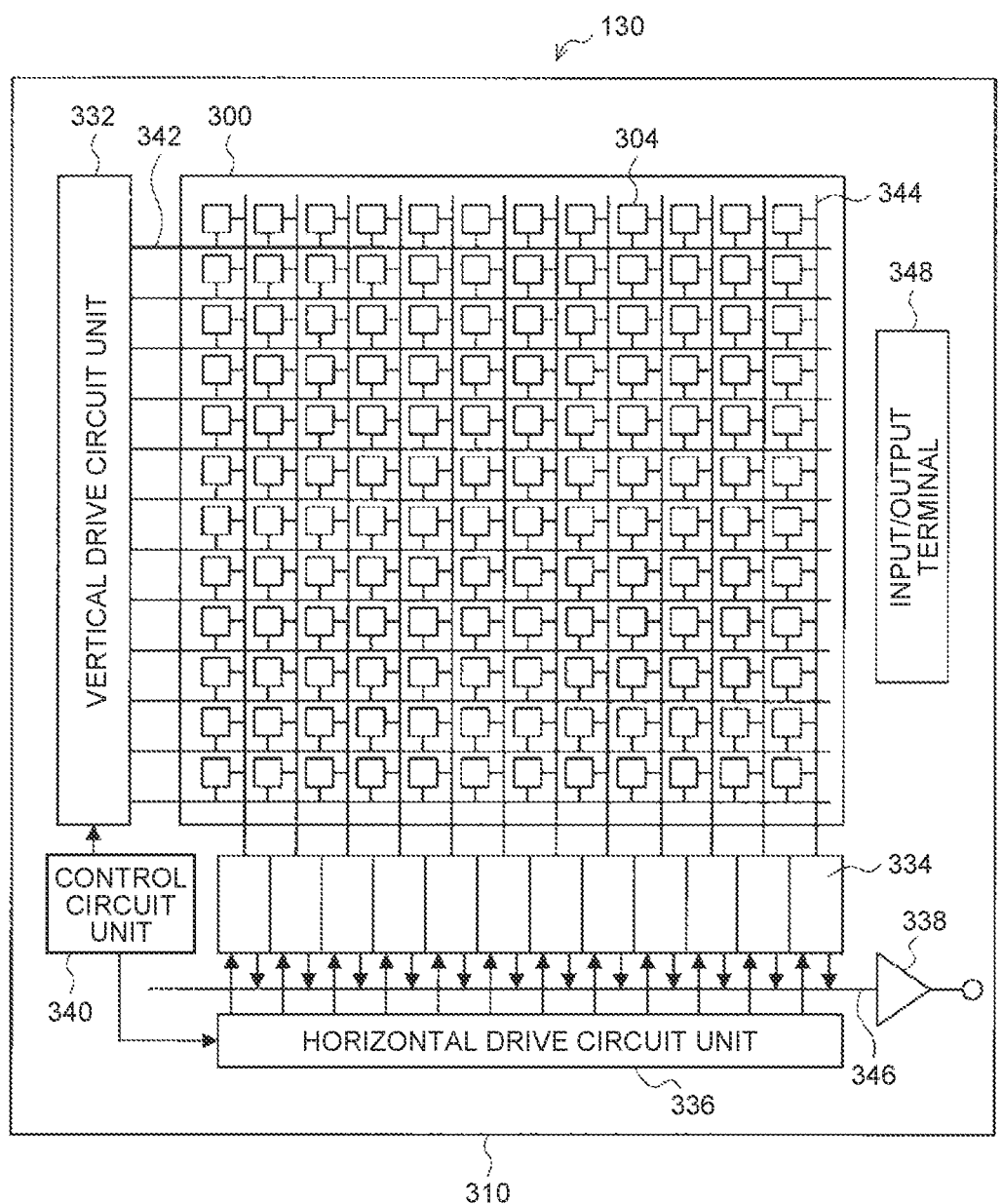
FIG. 5 is an explanatory diagram illustrating a planar configuration example of an image sensor 130 according to the first embodiment of the present disclosure.

Next, a schematic configuration of the image sensor 130 according to the present embodiment is explained with reference to FIG. 5. FIG. 5 is an explanatory diagram illustrating a planar configuration example of the image sensor 130 according to the present embodiment.

As illustrated in FIG. 5, the image sensor 130 according to the present embodiment includes the pixel array unit (the light receiving surface) 300 on which a plurality of pixels 304 are arranged in a matrix in the row direction and the column direction on a semiconductor substrate 310 made of, for example, silicon and a peripheral circuit unit provided to surround the pixel array unit 300. Further, the image sensor 130 includes, as the peripheral circuit unit, a vertical drive circuit unit 332, a column signal processing circuit unit 334, a horizontal drive circuit unit 336, an output circuit unit 338, and a control circuit unit 340. Details of blocks of the image sensor 130 are explained below.

(Pixel Array Unit 300)

The pixel array unit (the light receiving surface) 300 includes the plurality of pixels 304 two-dimensionally arranged in a matrix in the row direction and the column direction on the semiconductor substrate 310. Specifically, as explained above, the pixel array unit 300 is configured by arraying, in the column direction and the row direction, the units (the unit regions) 302 including a plurality of pixels 304 of different types. For example, the pixels 304 have a size of approximately 2.9 µm×2.9 µm. For example, in the pixel array unit 300, 1945 pixels 304 are arranged in the column direction and 1109 pixels 304 are arranged in the row direction. Note that details of the array of the pixels 304 in the present embodiment are explained below.

Each of the pixels 304 is an element that performs photoelectric conversion on incident light and includes a photoelectric conversion unit (not illustrated) and a plurality of pixel transistors (for example, MOS (Metal-Oxide-Semiconductor transistors) (not illustrated). The pixel transistor includes, for example, four MOS transistors including a transfer transistor, a selection transistor, a reset transistor, and an amplification transistor. Note that an equivalent circuit and a detailed structure of the pixel 304 are explained below.

(Vertical Drive Circuit Unit 332)

The vertical drive circuit unit 332 is formed by, for example, a shift register, selects a pixel drive wire 342, supplies a pulse for driving the pixels 304 to the selected pixel drive wire 342, and drives the pixels 304 in units of rows. That is, the vertical drive circuit unit 332 selectively scans the pixels 304 of the pixel array unit 300 sequentially in the vertical direction in units of rows and supplies a pixel signal based on a signal charge generated according to a light reception amount of photoelectric conversion units (not illustrated) of the pixels 304 to the column signal processing circuit unit 334 explained below through a vertical signal line 344.

(Column Signal Processing Circuit Unit 334)

The column signal processing circuit unit 334 is disposed for each of columns of the pixels 304 and performs signal processing such as noise removal for each of the columns of the pixels 304 on pixel signals output from the pixels 304 for one row. For example, the column signal processing circuit unit 334 performs signal processing such as CDS (Correlated Double Sampling) and AD (Analog-Digital) conversion in order to remove fixed pattern noise specific to the pixels 304.

(Horizontal Drive Circuit Unit 336)

The horizontal drive circuit unit 336 is formed by, for example, a shift register, selects, in order, each of the column signal processing circuit units 334 explained above by sequentially outputting horizontal scanning pulses, and causes each of the column signal processing circuit units 334 to output a pixel signal to a horizontal signal line 346.

(Output Circuit Unit 338)

The output circuit unit 338 performs signal processing on the pixel signal sequentially supplied from each of the column signal processing circuit units 334 explained above through the horizontal signal line 346 and outputs the pixel signal. The output circuit unit 338 may function as, for example, a functional unit that performs buffering or may perform processing such as black level adjustment, column variation correction, and various kinds of digital signal processing. Note that buffering means temporarily storing pixel signals in order to compensate for differences in processing speed and transfer speed when the pixel signals are exchanged. Further, an input/output terminal 348 is a terminal for exchanging signals with an external apparatus.

(Control Circuit Unit 340)

The control circuit unit 340 receives an input clock and data for instructing an operation mode or the like and outputs data such as internal information of the image sensor 130. That is, the control circuit unit 340 generates a clock signal or a control signal serving as a reference of operations of the vertical drive circuit unit 332, the column signal processing circuit unit 334, the horizontal drive circuit unit 336, and the like based on a vertical synchronization signal, a horizontal synchronization signal, and a master clock. The control circuit unit 340 outputs the generated clock signal and the generated control signal to the vertical drive circuit unit 332, the column signal processing circuit unit 334, the horizontal drive circuit unit 336, and the like.

Note that, in the present embodiment, the configuration of the image sensor 130 is not limited to the configuration illustrated in FIG. 5.

2.4 Equivalent Circuit of the Pixel

Figure 6:
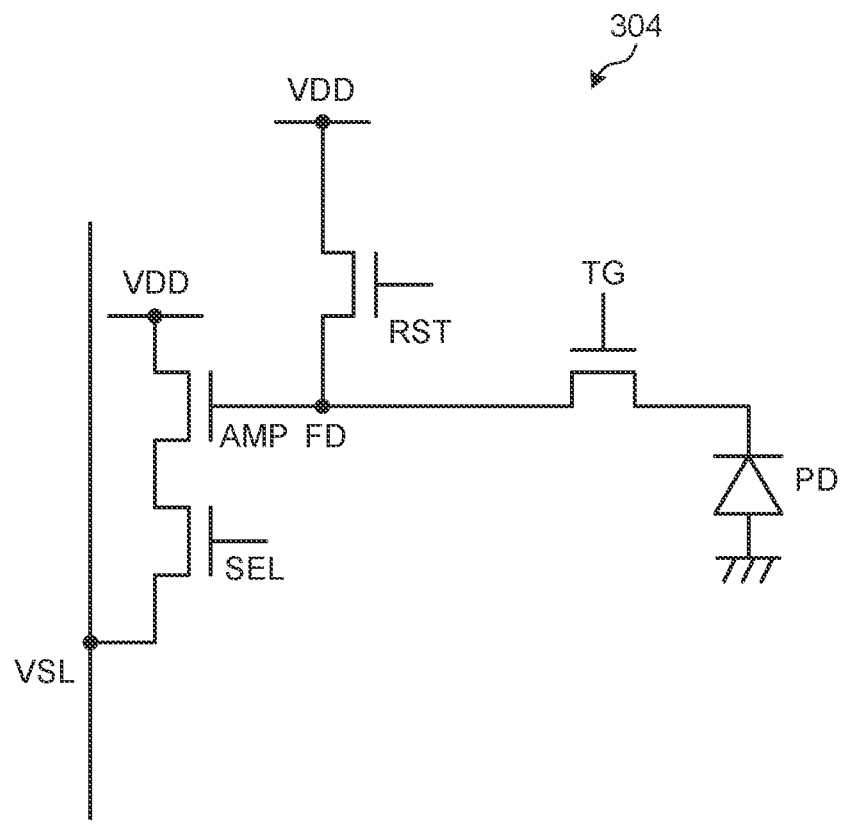
FIG. 6 is an equivalent circuit diagram of a pixel 304 according to the first embodiment of the present disclosure.

Next, an example of an equivalent circuit of the pixel 304 according to the present embodiment is explained with reference to FIG. 6. FIG. 6 is an equivalent circuit diagram of the pixel 304 according to the present embodiment.

As illustrated in FIG. 6, the pixel 304 includes a photodiode PD functioning as a photoelectric conversion element (a photoelectric conversion unit) that converts light into a charge, a transfer transistor TG, a floating diffusion region FD, a reset transistor RST, an amplification transistor AMP, and a selection transistor SEL.

Specifically, as illustrated in FIG. 6, in the pixel 304, one of a source and a drain of the transfer transistor TG is electrically connected to the photodiode PD that receives light and generates a charge and the other of the source and the drain of the transfer transistor TG is electrically connected to the floating diffusion region FD. The transfer transistor TG changes to a conductive state according to a voltage applied to a gate of the transfer transistor TG and can transfer the charge generated by the photodiode PD to the floating diffusion region FD.

The floating diffusion region FD is electrically connected to a gate of the amplification transistor AMP that converts a charge into a voltage and outputs the voltage as a pixel signal. One of a source and a drain of the amplification transistor AMP is electrically connected to one of a source and a drain of the selection transistor that outputs the pixel signal obtained by the conversion to a signal line VSL according to a selection signal. Further, the other of the source and the drain of the amplification transistor AMP is electrically connected to a power supply circuit (power supply potential VDD).

The other of the source and the drain of the selection transistor SEL is electrically connected to the signal line VSL for transmitting the converted voltage as a pixel signal and is further electrically connected to the column signal processing circuit unit 334 explained above. Further, a gate of the selection transistor SEL is electrically connected to a selection line (not illustrated) that selects a row for outputting a signal and is further electrically connected to the vertical drive circuit unit 332 explained above. That is, the charge accumulated in the floating diffusion region FD is converted into a voltage by the amplification transistor AMP under the control of the selection transistor SEL and is output to a signal line.

Further, as illustrated in FIG. 6, the floating diffusion region FD is electrically connected to one of a drain and a source of the reset transistor RST for resetting the accumulated charge. A gate of the reset transistor RST is electrically connected to a reset signal line (not illustrated) and is further electrically connected to the vertical drive circuit unit 332 explained above. The other of the drain and the source of the reset transistor RST is electrically connected to the power supply circuit (the power supply potential VDD). The reset transistor RST changes to a conductive state according to a voltage applied to a gate of the reset transistor RST and can reset the charge accumulated in the floating diffusion region FD (discharge the charge to the power supply circuit (the power supply potential VDD)).

Note that the equivalent circuit of the pixel 304 according to the present embodiment is not limited to the example illustrated in FIG. 6, and may include, for example, other elements (for example, a transistor) and is not particularly limited.

2.5 Sectional Configuration of the Pixel

Figure 7:
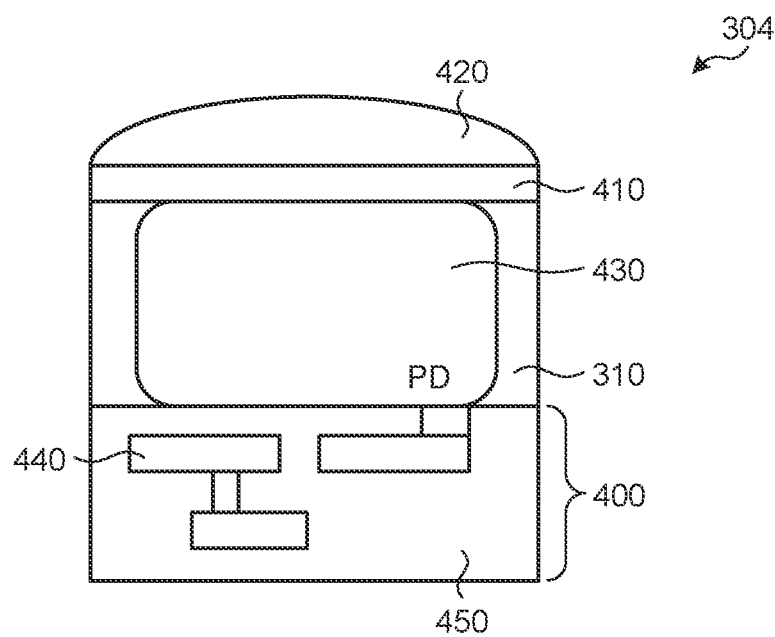
FIG. 7 is a sectional view of a pixel 304 according to the first embodiment of the present disclosure.

Next, a stacked structure of the pixel 304 according to the present embodiment is explained with reference to FIG. 7. FIG. 7 is a sectional view of the pixel 304 according to the present embodiment. To facilitate understanding, illustration of a part of an actual sectional configuration of the pixel 304 is omitted in FIG. 7. Further, in FIG. 7, a cross section of the pixel 304 is illustrated such that a light receiving surface that light made incident on the pixel 304 enters is at the top.

Specifically, as illustrated in FIG. 7, in the pixel 304, a semiconductor region 430 having a second conduction type (for example, an N type) is provided in a semiconductor region having a first conduction type (for example, a P type) of the semiconductor substrate 310 made of, for example, silicon. By such PN junction by the semiconductor region 430, the photodiode PD that converts light into a charge is formed in the semiconductor substrate 310.

In addition, a wiring layer 400 including a wire 440 formed of, for example, tungsten (W), aluminum (Al), copper (Cu), cobalt (Co), ruthenium (Ru), or the like and an interlayer insulating film 450 formed of silicon oxide ($SiO_2$) or the like is provided on the opposite side to the semiconductor substrate 310 with respect to the incident surface (the lower side of FIG. 7). Further, the wiring layer 400 is provided with a plurality of electrodes (not illustrated)

formed of W, Al, Cu, or the like as gate electrodes of a plurality of pixel transistors for reading out a charge generated in the photodiode PD. Specifically, the electrodes are provided to be opposed to a semiconductor region having the first conductivity type (for example, the P-type) in the semiconductor substrate 310 via an insulating film (not illustrated). Furthermore, a semiconductor region having a second conductivity type (for example, N type) is provided in the semiconductor substrate 310 so as to be adjacent to the semiconductor region having the first conductivity type, and the semiconductor region having the second conductivity type functions as a source/drain region of the pixel transistor.

Further, a floating diffusion unit (a common charge accumulation unit) (not illustrated), which is a semiconductor region having the second conduction type (for example, the N type), is provided in the semiconductor substrate 310. The floating diffusion unit can temporarily accumulate the charge generated by the photodiode PD.

In the present embodiment, as illustrated in FIG. 7, a filter 410 is provided for each of the pixels 304 on the incident surface of the semiconductor substrate 310. The filter 410 is a narrow band filter that transmits light having a wavelength in a predetermined range (wavelength band). For example, the color filter 410 can be formed of a material obtained by dispersing a pigment or a dye in a transparent binder such as silicone.

The filter 410 may be a plasmon filter. When light is made incident on a metal surface, an electromagnetic wave, which is a combination of light and an electron compressional wave, called surface plasmon is excited on the metal surface. Such excitation of surface plasmons can cause, in metal having a periodic fine structure formed on the surface thereof, an abnormal transmission phenomenon of plasmons that transmits light having a specific wavelength. Therefore, it is possible to obtain, using such a phenomenon, a filter that transmits light having a specific wavelength, that is, a plasmon filter.

In the present embodiment, as illustrated in FIG. 7, an on-chip lens 420 is provided for each of the pixels 304 on the incident surface of the semiconductor substrate 310. The on-chip lens 420 can be formed of, for example, $Si_3N_4$ or a resin material such as styrene resin, acrylic resin, styrene-acrylic copolymer resin, or siloxane resin.

Note that a sectional structure of the pixel 304 according to the present embodiment is not limited to the example illustrated in FIG. 7 and may include, for example, an antireflection layer and the like and is not particularly limited.

2.6 Array of the Pixels

Figure 8:
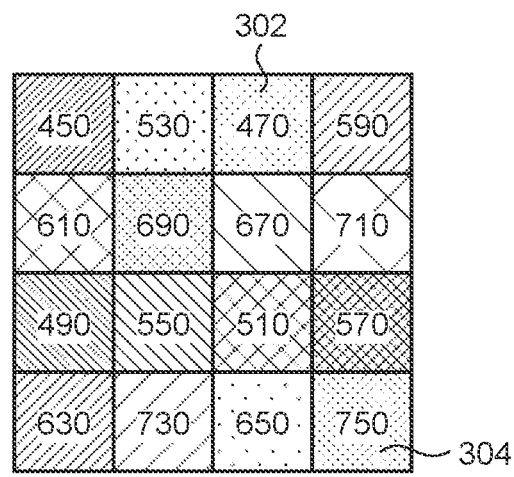
FIG. 8 is an explanatory diagram (No. 1) illustrating an example of a planar configuration of a unit 302 of a pixel array unit 300 of the image sensor 130 according to the first embodiment of the present disclosure.
Figure 9:
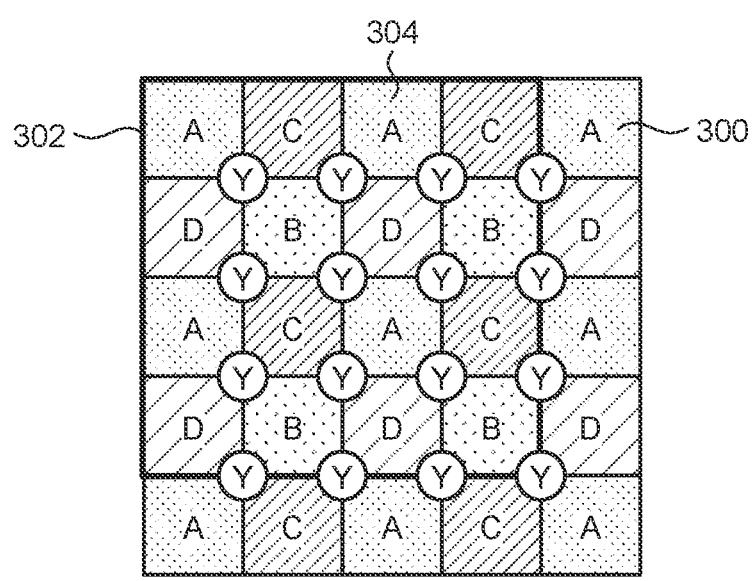
FIG. 9 is an explanatory diagram (No. 2) illustrating an example of a planar configuration of the unit 302 of the pixel array unit 300 of the image sensor 130 according to the first embodiment of the present disclosure.
Figure 10:
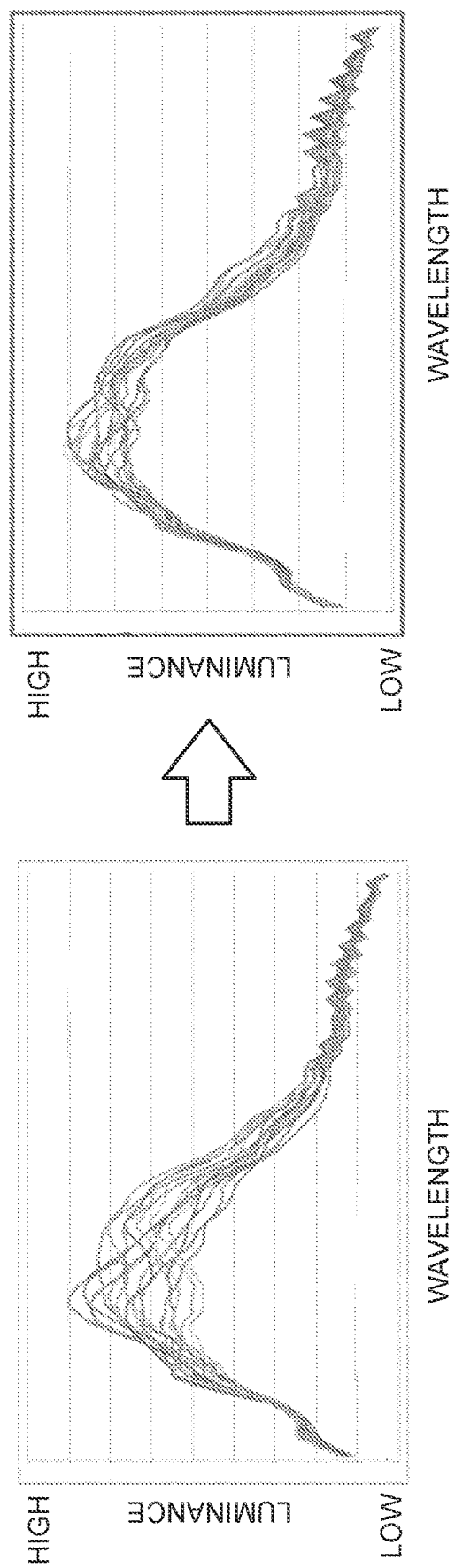
FIG. 10 is an explanatory diagram for explaining an example of mixed spectral characteristics according to the first embodiment of the present disclosure.

Next, an array of the pixels 304 in the present embodiment is explained with reference to FIG. 8 to FIG. 10. FIG. 8 and FIG. 9 are explanatory diagrams illustrating an example of a planar configuration of the unit 302 of the pixel array unit 300 of the image sensor 130 according to the present embodiment. Note that it is assumed that numbers shown on the pixels 304 of the unit 302 in FIG. 8 indicate median wavelengths of wavelength bands of light detectable by the pixels 304 and characters shown on the pixels 304 of the unit 302 in FIG. 9 indicates types of the pixels 304. Further, in FIG. 8 and FIG. 9, it is assumed that the pixels 304 can detect light in wavelength bands having substantially the same width. FIG. 10 is an explanatory diagram for explaining an example of mixed spectral characteristics in the present embodiment.

Specifically, the unit 302 according to the present embodiment is configured from, for example, sixteen different types of pixels 304 in 4 rows and 4 columns (m rows and n columns) as illustrated in FIG. 8. That is, the pixels 304 can detect light in wavelength bands that are different in stages. Note that, in the present embodiment, the types of the pixels 304 included in the unit 302 are not limited to the 16 types illustrated in FIG. 8 and are not particularly limited if the number of types is five or more. Further, in the present embodiment, the number of rows and the number of columns (m rows and n columns) of the pixels 304 in the unit 302 are not limited to the example illustrated in FIG. 8.

As explained above, in the present embodiment, since the unit 302 is repeated in the pixel array unit 300, a relative position of any point in the unit 302 can be represented by a spatial phase using the unit 302 as one cycle. Therefore, in the present embodiment, at points having any spatial phases on the pixel array unit 300, different types of pixels 304 are array such that mixed spectral characteristics obtained by mixing the spectral characteristics of the pixels 304 around the points are uniform (substantially the same).

More specifically, in the example illustrated in FIG. 8, in the unit 302, the pixels 304 that detect light in wavelength bands not adjacent to one another are arranged to be adjacent to one another in the row direction and the column direction and the pixels 304 that detect light in wavelength bands adjacent to one another are arranged not to be adjacent to one another in the row direction and the column direction.

With the image sensor 130 according to the present embodiment having such a unit 302, since light having wavelengths is uniformly detected by regions of the pixel array unit 300 of the image sensor 130, it is possible to complement color information of the pixels 304 with information concerning colors having no close wavelength in the demosaic processing. Therefore, in the present embodiment, since the color information of the pixels 304 can be complemented with color information without deviation, it is possible to obtain a color image having high luminance and high spectral spatial resolution. Further, in the present embodiment, since the pixels 304 that detect light having close wavelengths are not adjacent to one another, the pixels 304 are less easily affected by light from the adjacent pixels 304 and occurrence of color mixing can be suppressed.

Note that, in the present embodiment, the array of the pixels 304 is not limited to the example illustrated in FIG. 8. Therefore, another example will be explained with reference to FIG. 9.

Here, a plurality of points separated from one another by a predetermined number of pixels 304 are set on the pixel array unit 300. Specifically, in the example illustrated in FIG. 9, the plurality of points (points indicated by Y in the figure) are separated from one another by one pixel 304. Note that, in the present embodiment, the plurality of points are not limited to being separated from one another by one pixel 304 and are not particularly limited as long as if the plurality of points are separated by a fixed number of pixels 304.

Note that, as explained above, in the present embodiment, since the unit 302 is repeated in the pixel array unit 300, a relative position of any point in the unit 302 can be represented by a spatial phase using the unit 302 as one cycle. Therefore, it can be considered that the spatial phases of the Y points in FIG. 9 deviate from one another by $1/16$ cycle.

Further, in the present embodiment, the pixels 304 are arrayed such that mixed spectral characteristics obtained by mixing spectral characteristics of a predetermined number of pixels 304 surrounding the Y points are uniform (substantially the same) at all the Y points, in other words, uniform (substantially the same) at points having any spatial phases on the pixel array unit 300. More specifically, in the example illustrated in FIG. 9, the pixels 304 are arrayed such that mixed spectral characteristics obtained by mixing spectral characteristics of four pixels 304 surrounding the Y points are uniform (substantially the same) at all the Y points. Note that, in the present embodiment, the mixed spectral characteristics are not limited to the mixed spectral characteristics obtained by mixing the spectral characteristics of the four pixels 304 surrounding the Y points and are not particularly limited if the mixed spectral characteristics are obtained by mixing spectral characteristics of a predetermined number of pixels 304 that surround the Y points are in a positional relation of being adjacent to one another. For example, the array of the pixels 304 explained above can be searched as follows.

In the present embodiment, for example, the array of the pixels 304 is searched using an evaluation function eval in which an RMSE (Root Mean Squared Error), which is a square root of an average value of square values of differences (errors) between predicted values and correct values, is used. Specifically, the pixels 304 are applied to the unit 302 in a round robin manner to search for an array in which the evaluation function eval indicated by the following Formula (1) is minimized among all spatial phases.

$$eval = \frac{\sum_i RMSE\ (Y_{mean,\lambda}, Y_{i,\lambda})}{N_i} \quad (1)$$

$$RMSE\ (Y_{mean,\lambda}, Y_{i,\lambda}) = \sqrt{\frac{1}{N_\lambda} \sum_\lambda (Y_{mean,\lambda} - Y_{i,\lambda})^2}$$

$N_i$: Number of phases, $N_\lambda$: Number of wavelength bands
$Y_{i,\lambda}$: Mixed spectral characteristic of i-th phase
$Y_{mean,\lambda}$: Average value of mixed spectral characteristics of all phases With the image sensor 130 according to the present embodiment having such a unit 302, since light having wavelengths is uniformly detected by regions of the pixel array unit 300 of the image sensor 130, it is possible to complement color information of the pixels 304 with information concerning colors having no close wavelength in the demosaic processing. Therefore, in the present embodiment, since the color information of the pixels 304 can be complemented with color information without deviation, it is possible to obtain a color image having high luminance and high spectral spatial resolution.

Specifically, as illustrated on the left side of FIG. 10, mixed spectral characteristics at the Y points in the comparative example (the array illustrated on the left side of FIG. 1 and FIG. 2) have a large variation. However, as illustrated on the right side of FIG. 10, mixed spectral characteristics at the Y points in the present embodiment have a small variation.

Therefore, in the present embodiment, since the color information of the pixels 304 can be complemented with color information without deviation, it is possible to obtain a color image having high luminance and high spectral spatial resolution. Further, in the present embodiment, since the pixels 304 that detect light having close wavelengths are not adjacent to one another, the pixels 304 are less easily affected by light from the adjacent pixels 304 and occurrence of color mixing can be suppressed.

2.7 Configuration of the Signal Processing Unit

Figure 11:
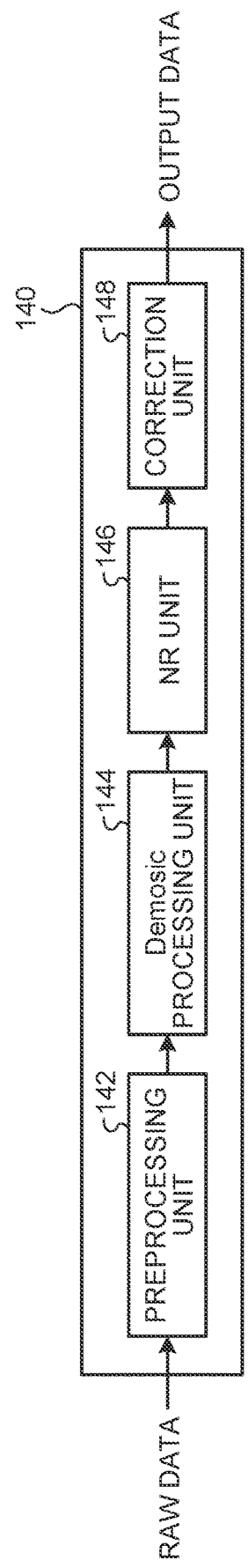
FIG. 11 is a block diagram illustrating an example of a functional configuration of a signal processing unit 140 according to the first embodiment of the present disclosure.

Next, a detailed configuration of the signal processing unit 140 is explained with reference to FIG. 11. FIG. 11 is a block diagram illustrating an example of a functional configuration of the signal processing unit 140 according to the first embodiment of the present disclosure.

As illustrated in FIG. 11, the signal processing unit 140 mainly includes a preprocessing unit 142, a demosaic processing unit 144, a noise reduction (NR) unit 146, and an output unit 148. The functional units of the signal processing unit 140 are sequentially explained below.

(Preprocessing Unit 142)

The preprocessing unit 142 can perform preprocessing on a pixel signal (Raw data) from the pixels 304 of the pixel array unit 300 of the image sensor 130 and output the preprocessed pixel signal to the demosaic processing unit 144 explained below.

For example, the preprocessing unit 142 may perform OPB (Optical Black) subtraction for removing a noise component caused by a dark current or the like that has occurred in the pixel 304. For example, the preprocessing unit 142 may perform defect position detection for detecting the position of the pixel 304 that has output a pixel signal having an abnormal value or may perform defect correction for correcting a pixel signal having an abnormal value. Further, for example, the preprocessing unit 142 may perform HDR (High Dynamic Range) combination for combining a plurality of pixel signals or the like to expand a dynamic range of luminance or the preprocessing unit 142 may perform noise suppression processing for suppressing predetermined noise. Note that, in the present embodiment, the processing performed by the preprocessing unit 142 is not limited to the processing explained above.

(Demosaic Processing Unit 144)

The demosaic processing unit 144 can perform the demosaic processing explained above. Specifically, the demosaic processing unit 144 can perform processing for complementing color information of one pixel 304 using pixel signals from the other plurality of pixels 304 that are adjacent to the one pixel 304 and can detect light in different wavelength bands. In the present embodiment, as explained above, since the light having the wavelengths is uniformly detected by the regions of the pixel array unit 300 of the image sensor 130, it is possible to complement color information of the pixels 304 with information concerning colors having no close wavelength. Therefore, in the present embodiment, since the color information of the pixels 304 can be complements with color information without deviation, it is possible to obtain a color image having high resolution. Further, the demosaic processing unit 144 can output processed image data to an NR unit explained below.

More specifically, the demosaic processing unit 144 sets a plurality of points (Y points) separated from one another by one pixel 304 on the pixel array unit 300 illustrated in FIG. 9. The demosaic processing unit 144 mixes pixel signals of the four pixels 304 surrounding the Y points. A pixel signal obtained by mixing the pixel signals includes luminance information of light having a wide wavelength linked with information of the position of the Y points. It is possible to obtain a color image having high color resolution based on such a pixel signal. Note that the present embodiment is not limited to mixing the pixel signals from the four pixels 304 surrounding the Y points illustrated in FIG. 9 and is not particularly limited if pixel signals of a predetermined number of pixels 304 that surround the Y points and are in a mutually adjacent positional relation are mixed.

Note that, in the present embodiment, when mixed spectral characteristics of the Y points are different, the demosaic processing unit 144 may adjust, based on the difference, a mixing ratio of pixel signals from a predetermined number of pixels 304 surrounding the Y points. Further, in the present embodiment, when mixed spectral characteristics of the Y points are different, the demosaic processing unit 144 may change the number and the positions of the pixels 304 based on the difference and mix pixel signals from these pixels 304.

Further, the demosaic processing unit 144 may perform spatial filtering (low-pass filter, high-pass filter, and band-pass filter) to correct the difference among the signal levels of the Y points. For example, the demosaic processing unit 144 may adjust characteristics/intensity of filtering according to spatial frequency characteristics (an edge and the like) of an image or may adjust characteristics/intensity of filtering according to a spectral characteristic of a light source that irradiates a subject with light or the subject.

Further, the demosaic processing unit 144 may adjust gains of mixed pixel signals at the Y points based on the difference among signal levels at the Y points. For example, the demosaic processing unit 144 may adjust the gains according to spectral characteristics of a light source that irradiates a subject with light or the subject.

(NR Unit 146)

The NR unit 146 can perform processing of removing noise on image data from the demosaic processing unit 144 and output the image data to the output unit 148 explained below. The NR unit 146 may perform correction such as shading correction and false color correction on the image data from the demosaic processing unit 144. Note that, in the present embodiment, the processing performed by the NR unit 146 is not limited to the processing explained above.

(Output Unit 148)

The output unit 148 can output image data obtained through various kinds of processing to an external apparatus such as the image processing apparatus 500.

As described above, in the present embodiment, since the light having the wavelengths is uniformly detected by the regions of the pixel array unit 300 of the image sensor 130, it is possible to complement (demosaic processing) the color information of the pixels 304 with information concerning colors having no close wavelength. Therefore, in the present embodiment, since the color information of the pixels 304 can be complements with color information without deviation, it is possible to obtain a color image having high resolution.

Note that, in the present embodiment, the configuration of the signal processing unit 140 is not limited to the configuration illustrated in FIG. 11.

2.8 Configuration of the Image Processing Apparatus

Figure 12:
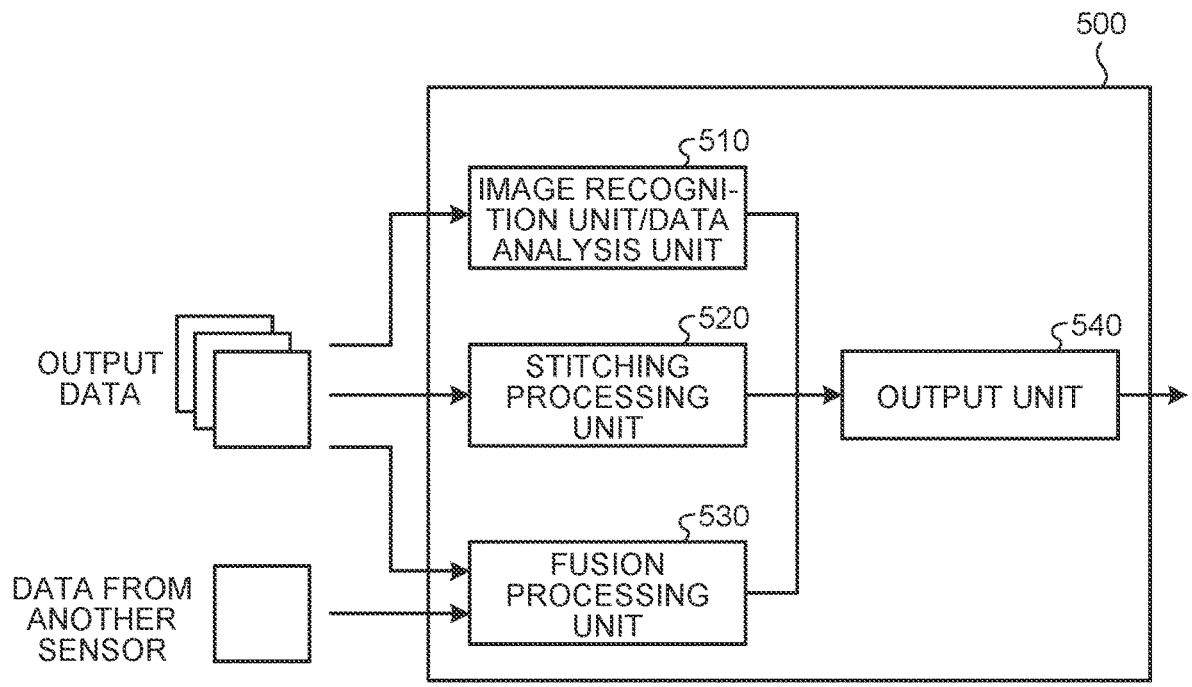
FIG. 12 is a block diagram illustrating an example of a functional configuration of an image processing apparatus 500 according to the first embodiment of the present disclosure.

Next, a detailed configuration of the image processing apparatus 500 according to the present embodiment is explained with reference to FIG. 12. FIG. 12 is a block diagram illustrating an example of a functional configuration of the image processing apparatus 500 according to the present embodiment. As illustrated in FIG. 12, the image processing apparatus 500 mainly includes an image recognition unit/data analysis unit 510, a stitching processing unit 520, a fusion processing unit 530, and an output unit 540. The functional units of the image processing apparatus 500 are sequentially explained below.

(Image Recognition Unit/Data Analysis Unit 510)

The image recognition unit/data analysis unit 510 can perform image recognition processing and analysis processing on image data obtained from the camera 100 using various methods. In the present embodiment, since the image recognition processing and the analysis processing can be performed using high-resolution image data, highly accurate recognition and analysis can be performed.

(Stitching Processing Unit 520)

The stitching processing unit 520 can perform stitching processing for joining a plurality of images in an adjacent positional relations to one another and can generate image data in a wider region. In the present embodiment, it is possible to accurately recognize a position based on a high-resolution luminance image. Since the stitching processing is performed using a result of the recognition, it is possible to perform the stitching processing with highly accurate alignment.

(Fusion Processing Unit 530)

The fusion processing unit 530 can acquire image data from the camera 100 and image data from another sensor and perform fusion processing. For example, the fusion processing unit 530 can perform fusion processing for superimposing image data from an RGB camera functioning as another sensor and image data from the camera 100. In this case, since a position can be accurately recognized based on a high-resolution luminance image, it is possible to accurately perform alignment of the image data from the RGB camera and the image data from the camera 100.

(Output Unit 540)

The output unit 540 can output images and data obtained through various kinds of processing to an external apparatus such as the server 600.

In the present embodiment, the image processing apparatus 500 is not limited to performing the processing explained above and can perform resolution enhancement by correlation processing and noise reduction (noise removal) by edge determination or the like using a high-resolution luminance image. Further, the image processing apparatus 500 can also highly accurately perform a motion vector search using a high-resolution luminance image and highly accurately perform noise reduction in the time direction.

As explained above, in the present embodiment, since the image recognition processing, the analysis processing, the stitching processing, the fusion processing, and the like can be performed using the color image having high resolution, it is possible to improve the accuracy of the respective kinds of processing.

Note that, in the present embodiment, the configuration of the image processing apparatus 500 is not limited to the configuration illustrated in FIG. 12. The image processing apparatus 500 may be configured such that, for example, the image recognition unit/data analysis unit 510, the stitching processing unit 520, and the fusion processing unit 530 cooperate with one another

2.9 Image Processing

Figure 13:
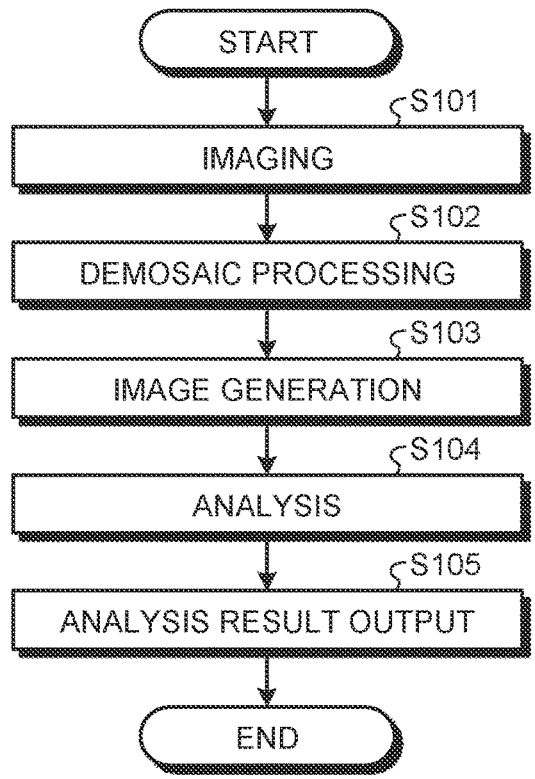
FIG. 13 is a flowchart illustrating an example of image processing according to the first embodiment of the present disclosure.

Next, an example of image processing according to the present embodiment is explained with reference to FIG. 13. FIG. 13 is a flowchart illustrating an example of image processing according to the first embodiment of the present disclosure. As illustrated in FIG. 13, the image processing according to the present embodiment includes a plurality of steps from Step S101 to Step S105. Details of the steps included in the image processing according to the present embodiment are explained below.

First, a subject is imaged by the camera 100 (Step S101). Subsequently, the camera 100 performs demosaic processing using pixel signals (Raw data) from the pixels 304 of the image sensor 130 (Step S102). Further, the camera 100 generates image data based on the pixel signals subjected to the demosaic processing and outputs the image data to the image processing apparatus 500 (Step S103).

Further, the image processing apparatus 500 performs an analysis using a high-resolution image from the camera 100 (Step S104). Then, the image processing apparatus 500 outputs an analysis result obtained in Step S104 explained above to the server 600 (Step S105).

3. Second Embodiment

Figure 14:
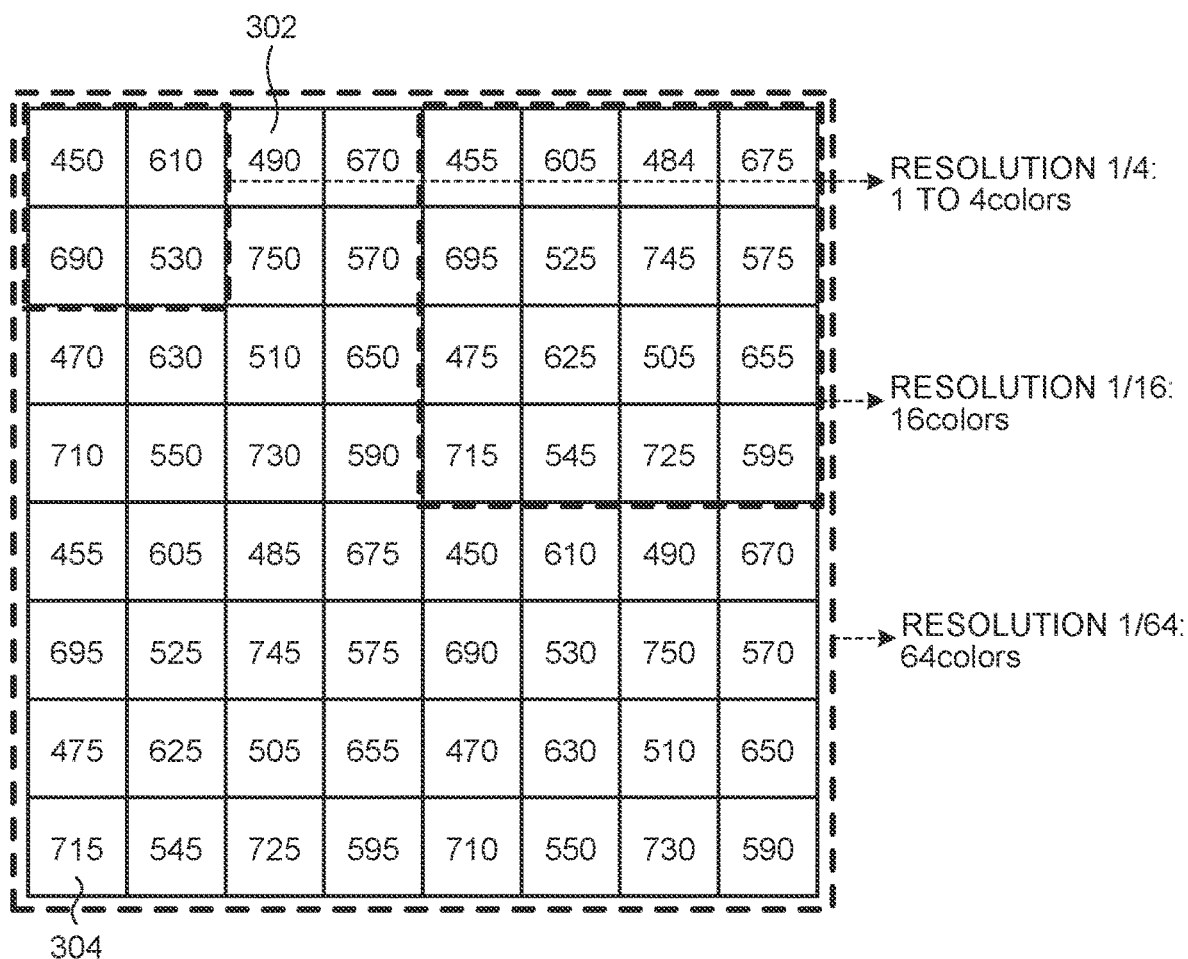
FIG. 14 is an explanatory diagram illustrating an example of a planar configuration of the unit 302 of the pixel array unit 300 of the image sensor 130 according to a second embodiment of the present disclosure.

Next, a second embodiment of the present disclosure is explained with reference to FIG. 14. FIG. 14 is an explanatory diagram illustrating an example of a planar configuration of the unit 302 of the pixel array unit 300 of the image sensor 130 according to the present embodiment. Note that numbers shown on the pixels 304 of the unit 302 in FIG. 14 indicates median wavelengths of wavelength bands of light detectable by the pixels 304. Further, in FIG. 14, it is assumed that the pixels 304 can detect light in wavelength bands having substantially the same width.

In the present embodiment, the pixels 304 to be used can be selected according to a subject, imaging conditions (a state of illumination light and the like), resolution required depending on an application, and the like.

Specifically, the unit 302 according to the present embodiment is configured from, for example, as illustrated in FIG. 14, sixty-four types of pixels 304 in 48 rows and 8 columns (m rows and n columns). That is, the pixels 304 can detect light in wavelength bands that are different in stages. Note that, in the present embodiment, the types of the pixels 304 included in the unit 302 are not limited to sixty-four types illustrated in FIG. 14 and are not particularly limited if the types are five or more types. Further, in the present embodiment, the number of rows and the number of columns (m rows and n columns) of the pixels 304 in the unit 302 are not limited to the example illustrated in FIG. 14.

In the present embodiment as well, as in the first embodiment explained above, since the unit 302 is repeated in the pixel array unit 300, a relative position of an any point in the unit 302 can be represented by a spatial phase using the unit 302 as one cycle. Therefore, in the present embodiment as well, at points having any spatial phases on the pixel array unit 300, the pixels 304 of different types are arrayed such that mixed spectral characteristics obtained by mixing spectral characteristics of the pixels 304 around the points are uniform (substantially the same).

In the present embodiment, for example, a range of the pixels 304 to be used in the pixel array unit 300 is selected according to spatial resolution and wavelength resolution required for each of applications.

More specifically, when four pixels 304 at the upper left end of FIG. 14 are selected, the spatial resolution is ¼ and light in four wavelength bands can be detected. When the sixteen pixels 304 at the upper right end of FIG. 14 are selected, the spatial resolution is ¹⁄₁₆ and light in sixteen wavelength bands can be detected. Further, when sixty-four pixels 304 in entire FIG. 14 are selected, the spatial resolution is ¹⁄₆₄ and light in sixty-four wavelength bands can be detected. Note that, in the present embodiment, the mixing ratio and the like explained above may be adjusted for each of applications.

As explained above, in the present embodiment, at points having any spatial phases on the pixel array unit 300, the pixels 304 of different types are arrayed such that mixed spectral characteristics obtained by mixing spectral characteristics of the pixels 304 around the points are uniform (substantially the same). Therefore, according to the present embodiment, by selecting a range of the pixels 304 to be used from such an array of the pixels 304, it is possible to obtain suitable spatial resolution and wavelength resolution according to an application.

4. Summary

As explained above, with the array and the processing of the pixels 304 according to the embodiment of the present disclosure, since light having wavelengths is uniformly detected by the regions of the pixel array unit 300 of the image sensor 130, it is possible to complement (perform demosaic processing of) color information of the pixels 304 with information concerning colors having no close wavelength. Therefore, in the present embodiment, since the color information of the pixels 304 can be complements with color information without deviation, it is possible to obtain a color image having high resolution. Further, in the present embodiment, since the image recognition processing, the analysis processing, the stitching processing, the fusion processing, and the like can be performed using the color image having the high resolution, it is possible to improve the accuracy of the respective kinds of processing.

The image sensor 130 according to the embodiment of the present disclosure can be manufactured by using a method, an apparatus, and conditions used for manufacturing a general semiconductor device. That is, the image sensor 130 according to the present embodiment can be manufactured using an existing semiconductor device manufacturing process.

Note that examples of the method explained above include a PVD (Physical Vapor Deposition) method, a CVD (Chemical Vapor Deposition) method, and an ALD (Atomic Layer Deposition) method. Examples of the PVD method include a vacuum vapor deposition method, an EB (electron beam) vapor deposition method, various sputtering methods (a Magnetron sputtering method, an RF (Radio Frequency)-DC (Direct Current) coupled bias sputtering method, an ECR (Electron Cyclotron Resonance) sputtering method, a counter target sputtering method, a high frequency sputtering method, and the like), an ion plating method, a laser ablation method, a molecular beam epitaxy (MBE) method, and a laser transfer method. Examples of the CVD method include a plasma CVD method, a thermal CVD method, an organic metal (MO) CVD method, and a photo CVD method. Further, other methods include an electrolytic plating method, an electroless plating method, a spin coating method; an immersion method; a cast method; a microcontact printing; a drop cast method; a various printing methods such as a screen printing method, an inkjet printing method, an offset printing method, a gravure printing method, and a flexographic printing method; a stamping method; a spray method; and various coating methods such as an air doctor coater method, a blade coater method, a rod coater method, a knife coater method, a squeeze coater method, a reverse roll coater method, a transfer roll coater method, a gravure coater method, a kiss coater method, a cast coater method, a spray coater method, a slit orifice coater method, and a calendar coater method. Further, examples of the patterning method include chemical etching such as shadow mask, laser transfer, and photolithography and physical etching by ultraviolet rays, laser, or the like. In addition, examples of a planarization technique include a CMP (Chemical Mechanical Polishing) method, a laser planarization method, and a reflow method.

5. Application Examples

For example, the technology according to the present disclosure can be applied to various uses and loaded in various kinds of electronic equipment. Therefore, examples of uses and electronic equipment to which the present technology can be applied are explained below.

5.1 Uses

Recently, for example, there have been demands for a technique for measuring degrees of activity of plants by photographing various plants such as crops, flowers, and trees using, for example, a camera and analyzing photographed images. For example, as a vegetation index indicating a degree of activity of a plant, there is, for example, an NDVI (Normalized Difference Vegetation Index). The NDVI of the plant photographed in an image is calculated by analyzing the image, whereby the activity degree of the plant in the photographed image can be estimated.

For such NDVI calculation processing, it is necessary to highly accurate analyze color components contained in the plant, which is a subject. Therefore, since an image having high resolution can be obtained by applying the technology of the present disclosure, it is possible to perform highly accurate NDVI calculation and it is possible to accurately estimate a degree of activity of a plant in a captured image.

Note that the technology of the present disclosure can be applied to quality inspection, medical inspection, and the like in industrial products (for example, food products and precision equipment). Further, since the technology of the present disclosure can accurately detect a skin color of a user's face, it is possible to provide a service for, for example, proposing cosmetics and makeup methods and proposing color coordination of clothes according to a detection result of the skin color. Further, the technology of the present disclosure can also analyze the detection result of the skin color, recognize a physiological state or a psychological state of the user, and make proposals for treatment and health promotion and proposals for commodities, services, and the like.

5.2 Application Example to an Unmanned Flying Object

Figure 15:
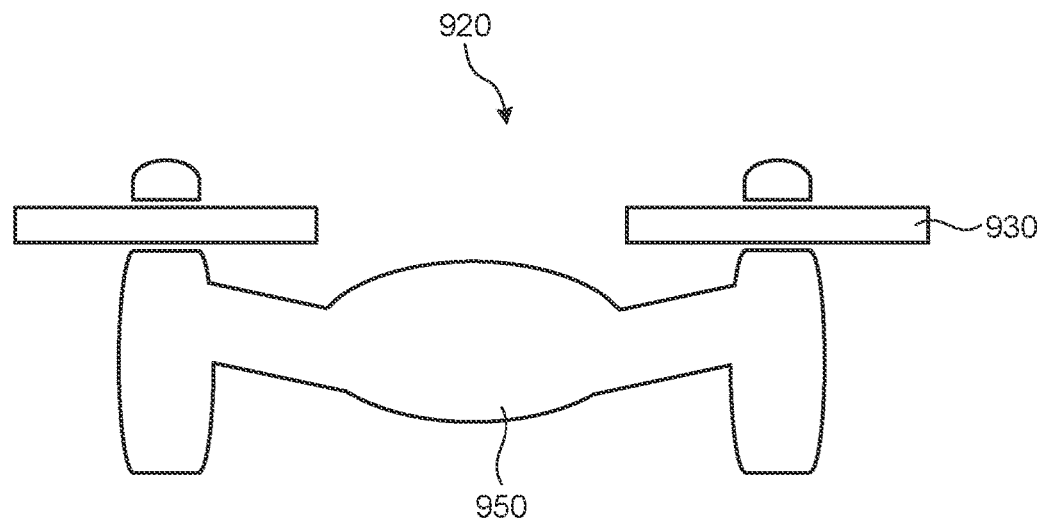
FIG. 15 is a schematic view of an exterior of an unmanned flying object 920.
Figure 16:
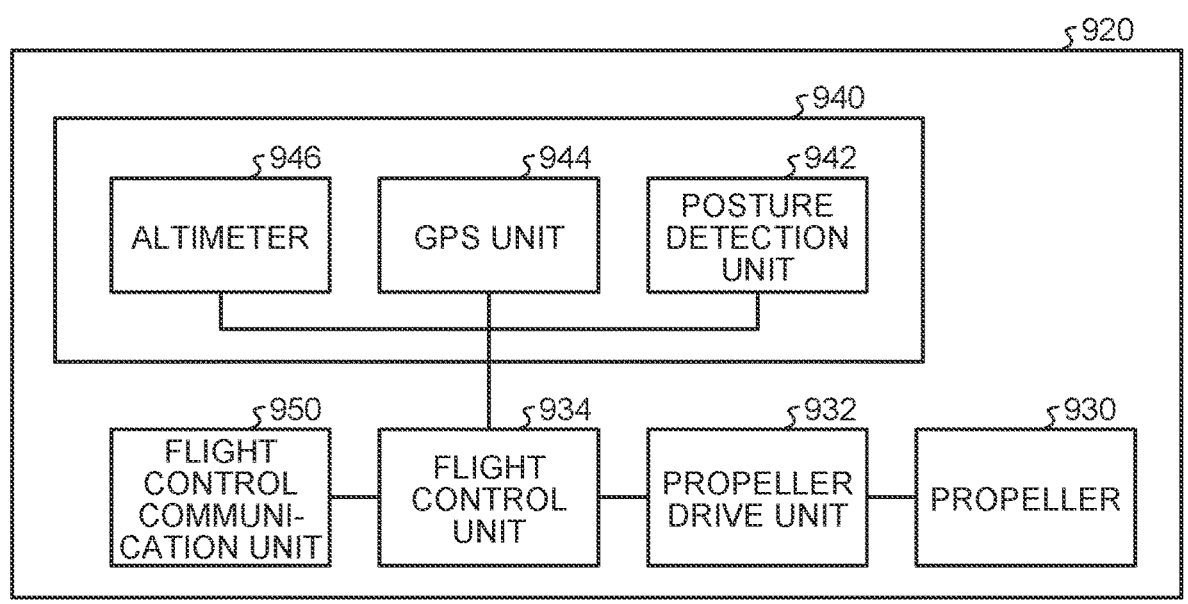
FIG. 16 is a block diagram illustrating an example of a schematic functional configuration of the unmanned flying object 920.

The technology according to the present disclosure can be applied to a camera mounted on an unmanned flying object. Therefore, an unmanned flying object on which the camera 100 according to the embodiment of the present disclosure can be mounted is explained with reference to FIG. 15 and FIG. 16. FIG. 15 is a schematic diagram of an exterior of an unmanned flying object 920 and specifically is a schematic diagram of the unmanned flying object 920 viewed from a front surface 960 thereof. FIG. 16 is a block diagram illustrating an example of a schematic functional configuration of the unmanned flying object 920.

The unmanned flying object 920 is an unmanned small airplane and can fly with an autonomous flight function, an autonomous posture control function, and the like. The unmanned flying object 920 mainly includes propellers 930, a propeller drive unit 932, a flight control unit 934, a positioning unit 940, and a flight control communication unit 950. The functional units of the unmanned flying object 920 are explained below.

As illustrated in FIG. 15, a plurality of propellers 930 are provided in upper parts of the unmanned flying object 920 and are rotated by power transmitted from the propeller drive unit 932 provided on the inside of the unmanned flying object 920 to thereby apply a propulsive force to the unmanned flying object 920 and horizontally holding a posture of the unmanned flying object 920. The propeller drive unit 932 is provided on the inside of the unmanned flying object 920 and rotates the propellers 930 according to control from the flight control unit 934 explained below.

The positioning unit 940 is provided on the inside of the unmanned flying object 920, acquires two-dimensional position information (longitude information and latitude information) and altitude information, which are position information, of the unmanned flying object 920 and posture information and acceleration information of the unmanned flying object 920, and outputs the information to the flight control unit 934 explained below. The output position information, the output posture information, and the like are used to cause the unmanned flying object 920 to fly to a desired place and maintaining the unmanned flying object 920 in a horizontal posture.

As illustrated in FIG. 16, the positioning unit 940 mainly includes a posture detection unit 942, a GPS (Global Positioning System) unit 944, and an altimeter 946. Specifically, the posture detection unit 942 includes, for example, a gyro sensor or the like in which an acceleration sensor and an angular velocity sensor are combined and detects a posture (inclination, direction, and the like) and acceleration of the unmanned flying object 920. The GPS unit 944 includes a current position measurement device that performs measurement using a GPS signal from a GPS satellite and can acquire two-dimensional position information (latitude information and longitude information) on the ground surface of the unmanned flying object 920. The altimeter 946 can acquire altitude information (height from the ground surface) of the unmanned flying object 920.

Note that the positioning unit 940 may not include the altimeter 946 when the GPS unit 944 can acquire altitude information having sufficient accuracy. However, the altitude information obtained by the GPS unit 944 sometimes has low accuracy depending on a positioning state. In this case, altitude information used for, for example, flight of the unmanned flying object 920 sometimes does not have sufficient accuracy. Therefore, in order to acquire altitude information having sufficient accuracy, the positioning unit 940 preferably includes the altimeter 946.

When receiving a control signal from a control device (not illustrated) of a pilot, the flight control unit 934 controls the propeller drive unit 932 according to a flight instruction of the control signal while using the position information, the attitude information, and the like acquired by the positioning unit 940 explained above.

The flight control communication unit 950 performs wireless communication with the control device (not illustrated) of the pilot and transmits and receives control signals and the like used for the flight of the unmanned flying object 920. For example, the flight control communication unit 950 receives a control signal from the control device at every predetermined time and outputs the received control signal to the flight control unit 934 explained above.

By applying the technology according to the present disclosure to the unmanned flying object 920, for example, a grain field is imaged from above by the camera 100 mounted on the unmanned flying object 920 and colors of an image of the grain field is analyzed with high resolution, whereby it is possible to recognize a growth situation of grains.

Further, the technology according to the present disclosure (the present technology) can be applied to various kinds of electronic equipment such as a smartphone and an industrial camera provided in a production line.

6. Example of a Hardware Configuration

Figure 17:
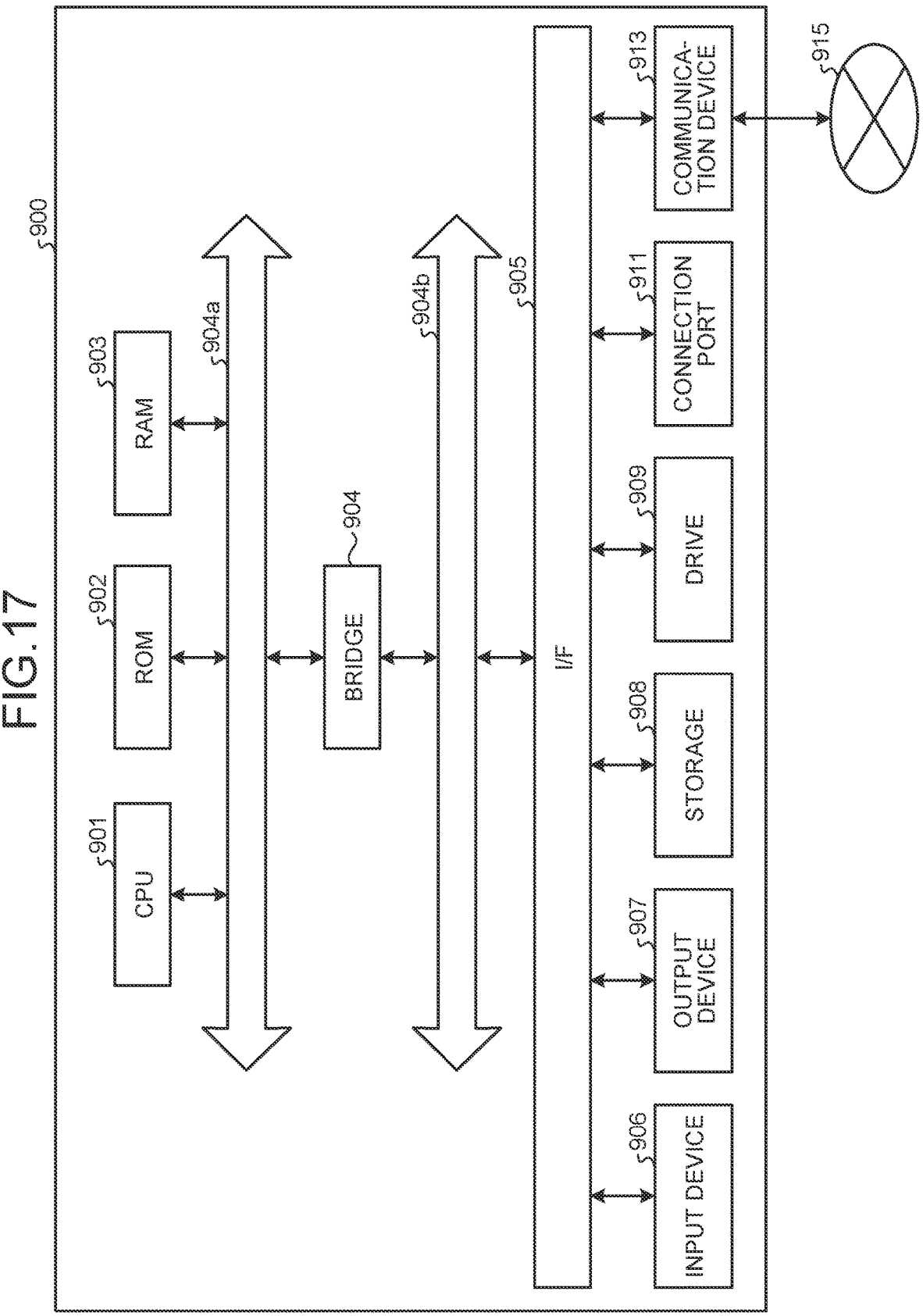
FIG. 17 is a block diagram illustrating an example of a hardware configuration.

FIG. 17 is a block diagram illustrating an example of a hardware configuration. In the following explanation, the image processing apparatus 500 is explained as an example. However, the same explanation is possible for the server 600. The image processing apparatus 500 can be configured by hardware 900 explained below. Various kinds of processing by the image processing apparatus 500 are realized by cooperation of software and the hardware 900.

As illustrated in FIG. 17, the hardware 900 includes a CPU (Central Processing Unit) 901, a ROM (Read Only Memory) 902, a RAM (Random Access Memory) 903, and a host bus 904a. The hardware 900 includes a bridge 904, an external bus 904b, an interface 905, an input device 906, an output device 907, a storage 908, a drive 909, a connection port 911, and a communication device 913. The hardware 900 may include a processing circuit such as a DSP (Digital Signal Processor) or an ASIC (Application Specific Integrated Circuit) instead of or in addition to the CPU 901.

The CPU 901 functions as an arithmetic processing device and a control device and controls the overall operation in the hardware 900 according to various programs. The CPU 901 may be a microprocessor. The ROM 902 stores programs, arithmetic operation parameters, and the like used by the CPU 901. The RAM 903 temporarily stores programs used in the execution of the CPU 901, parameters that change as appropriate in the execution, and the like. The CPU 901 can implement, for example, the stitching processing unit 520 and the like of the image processing apparatus 500.

The CPU 901, the ROM 902, and the RAM 903 are mutually connected by a host bus 904a including a CPU bus. The host bus 904a is connected to the external bus 904b such as a PCI (Peripheral Component Interconnect/Interface) bus via the bridge 904. Note that the host bus 904a, the bridge 904, and the external bus 904b do not always need to have configurations separated from one another and may be implemented in a single configuration (for example, one bus).

The input device 906 is implemented by, for example, a device to which information is input by an implementer such as a mouse, a keyboard, a touch panel, a button, a microphone, a switch, and a lever. The input device 906 may be, for example, a remote control device using infrared rays or other radio waves or may be external connection equipment such as a mobile phone or a PDA (Personal Digital Assistant) corresponding to operation of the hardware 900. Further, the input device 906 may include, for example, an input control circuit or the like that generates an input signal based on information input by the implementer using the input means explained above and outputs the input signal to the CPU 901. By operating the input device 906, the implementer can input various data to the hardware 900 and instruct a processing operation.

The output device 907 is formed of a device capable of visually or audibly notifying acquired information to the implementer. As such a device, there are a display device such as a CRT (Cathode Ray Tube) display device, a liquid crystal display device, a plasma display device, an EL (Electro Luminescent) display device, and a lamp, a sound output device such as a speaker and a headphone, and a printer device.

The storage 908 is a device for storing data. The storage 908 is implemented by, for example, a magnetic storage unit device such as an HDD (Hard Disk Drive), a semiconductor storage device, an optical storage device, a magneto-optical storage device, or the like. The storage 908 may include a storage medium, a recording device that records data in the storage medium, a reading device that reads data from the storage medium, and a deletion device that deletes data recorded in the storage medium. The storage 908 stores programs to be executed by the CPU 901, various data, various data acquired from the outside, and the like.

The drive 909 is a reader/writer for a storage medium and is built in or externally attached to the hardware 900. The drive 909 reads information recorded in a mounted removable storage medium such as a magnetic disk, an optical disk, a magneto-optical disk, or a semiconductor memory and outputs the information to the RAM 903. The drive 909 can also write information in the removable storage medium.

The connection port 911 is an interface connected to external equipment and is a connection port to external equipment capable of transmitting data with, for example, a USB (Universal Serial Bus) or the like.

The communication device 913 is, for example, a communication interface formed by a communication device or the like for connection to the network 915. The communication device 913 is, for example, a communication card for a wired or wireless LAN (Local Area Network), LTE (Long Term Evolution), Bluetooth (registered trademark), or a wireless USB (WUSB). The communication device 913 may be a router for optical communication, a router for ADSL (Asymmetric Digital Subscriber Line), a modem for various kinds of communication, or the like. The communication device 913 can transmit and receive signals and the like, for example, to and from the Internet and other communication equipment according to a predetermined protocol such as TCP/IP (Transmission Control Protocol/Internet Protocol).

Note that the network 915 is a wired or wireless transmission path for information transmitted from a device connected to the network 915. For example, the network 915 may include a public line network such as the Internet, a telephone line network, or a satellite communication network, various LANs (Local Area Networks) including Ethernet (registered trademark), or a WAN (Wide Area Network). The network 915 may include a dedicated line network such as an IP-VPN (Internet Protocol-Virtual Private Network).

The hardware configuration example capable of realizing the functions of the image processing apparatus 500 is explained above. The components explained above may be realized using general-purpose members or may be realized by hardware specialized for the functions of the components. Therefore, it is possible to appropriately change, as appropriate, the hardware configuration in use according to a technical level at every time when the present disclosure is implemented.

7. Supplement

Note that the embodiments of the present disclosure explained above can include, for example, a program for executing an image processing method executed by the camera 100 (specifically, the signal processing unit 140), the image processing apparatus 500, the server 600, or the like explained above and a non-transitory tangible medium in which the program is recorded. The program may be distributed via a communication line (including wireless communication) such as the Internet.

The steps in the image processing method in the embodiment of the present disclosure explained above may not always be processed according to the described order. For example, the steps may be processed with the order changed as appropriate. The steps may be partially processed in parallel or individually instead of being processed in time series. Further, the processing of the steps may not always be processed according to the described method and may be processed by, for example, another functional unit according to another method.

The illustrated components of the devices are functionally conceptual and are not always required to be physically configured as illustrated in the figures. That is, specific forms of distribution and integration of the devices are not limited to the illustrated forms and all or a part thereof can be configured by being functionally or physically distributed and integrated in any unit according to various loads, usage situations, and the like.

The preferred embodiment of the present disclosure is explained in detail above with reference to the accompanying drawings. However, the technical scope of the present disclosure is not limited to such an example. It is evident that those having the ordinary knowledge in the technical field of the present disclosure can arrive at various alterations or corrections within the category of the technical idea described in claims. It is understood that these alterations and corrections naturally belong to the technical scope of the present disclosure.

The effects described in the present specification are only explanatory or illustrative and are not limiting. That is, the technique according to the present disclosure can achieve other effects obvious for those skilled in the art from the description of the present specification together with or instead of the effects described above.

Note that the present technique can also take the following configurations.

(1) An imaging device comprising
a pixel array unit configured by arraying, in a row direction and a column direction, a plurality of pixels of five or more types in which wavelength bands of detectable light are different in stages, wherein
the plurality of pixels are arrayed such that, at points having any spatial phases on the pixel array unit, mixed spectral characteristics obtained by mixing spectral characteristics of a predetermined number of pixels around the points are substantially same.

(2) The imaging device according to (1), wherein the mixed spectral characteristics are substantially the same at the points separated from one another by a predetermined number of pixels on the pixel array unit.

(3) The imaging device according to (1) or (2), wherein,
in the pixel array unit, the pixels that detect light in wavelength bands not adjacent to one another are arranged to be adjacent in the row direction and the column direction.

(4) The imaging device according to any one of (1) to (3), wherein,
in the pixel array unit, the pixels that detect light in wavelength bands adjacent to one another are arranged not to be adjacent in the row direction and the column direction.

(5) The imaging device according to (1) or (2), wherein,
in the pixel array unit, the plurality of pixels are arranged such that an evaluation function indicated by a following Formula (1) is minimized.

$$eval = \frac{\sum_i RMSE(Y_{mean,\lambda}, Y_{i,\lambda})}{N_i} \quad (1)$$

$$RMSE(Y_{mean,\lambda}, Y_{i,\lambda}) = \sqrt{\frac{1}{N_\lambda}\sum_\lambda (Y_{mean,\lambda} - Y_{i,\lambda})^2}$$

$N_i$: Number of phases, $N_\lambda$: Number of wavelength bands
$Y_{i,\lambda}$: Mixed spectral characteristic of i-th phase
$Y_{mean,\lambda}$: Average value of mixed spectral characteristics of all phases (6) The imaging device according to any one of (1) to (5), wherein the pixel array unit is configured by arraying, in the row direction and the column direction, unit regions including the plurality of pixels arrayed in m rows and n columns.

(7) The imaging device according to (2), wherein
the points are separated from one another by a singularity of the pixel on the pixel array unit, and
the mixed spectral characteristics are obtained by mixing the spectral characteristics of a quadruple of the pixels surrounding the points.

(8) The imaging device according to (1), further comprising
a signal processing unit that acquires a pixel signal from each of the plurality of pixels and generates image data based on the acquired pixel signal, wherein
the signal processing unit mixes the pixel signals obtained from each of the predetermined number of pixels surrounding the points and generates the image data from the mixed pixel signal.

(9) The imaging device according to (8), wherein
the signal processing unit adjusts, based on a difference among the mixed spectral characteristics of the points, a mixing ratio of the pixel signals obtained from each of the predetermined number of pixels surrounding the points.

(10) The imaging device according to (9), wherein the signal processing unit performs spatial filtering according to a difference between signal levels of the pixel signals mixed to correspond to the points.

(11) The imaging device according to (10), wherein the signal processing unit adjusts characteristics/intensity of the spatial filtering according to a spatial frequency characteristic of the image data.

(12) The imaging device according to (10), wherein the signal processing unit adjusts characteristics/intensity of the spatial filtering according to a spectral characteristic of a light source that irradiates a subject with light or the subject.

(13) The imaging device according to (9), wherein the signal processing unit adjusts a gain of the mixed pixel signal according to a difference among signal levels of the pixel signals mixed to correspond to the points.

(14) The imaging device according to (13), wherein the signal processing unit adjusts the gain according to a spectral characteristic of a light source that irradiates a subject with light or the subject.

(15) The imaging device according to (8), wherein the signal processing unit selects the plurality of pixels to be used in generation of the image data based on a subject, an imaging condition, or a desired resolution.

(16) The imaging device according to any one of (8) to (15), further comprising a stitching processing unit that acquires a plurality of the image data and performs processing for joining the image data to one another.

(17) The imaging device according to any one of (8) to (16), further comprising a fusion processing unit that acquires the image data and image data from another sensor and performs fusion processing.

(18) The imaging device according to any one of (8) to (17), further comprising an image recognition unit that acquires the image data and performs image recognition.

(19) The imaging device according to any one of (8) to (18), further comprising an analysis unit that acquires and analyzes the image data.

(20) Electronic equipment on which an imaging device is mounted,
the imaging device including
a pixel array unit configured by arraying, in a row direction and a column direction, a plurality of pixels of five or more types in which wavelength bands of detectable light are different in stages, wherein
the plurality of pixels are arrayed such that, at points having any spatial phases on the pixel array unit, mixed spectral characteristics obtained by mixing spectral characteristics of a predetermined number of pixels around the points are substantially same.

REFERENCE SIGNS LIST

10 INFORMATION PROCESSING SYSTEM
100 CAMERA
110 OPTICAL LENS
120 SHUTTER MECHANISM
130 IMAGE SENSOR
140 SIGNAL PROCESSING UNIT
142 PREPROCESSING UNIT
144 DEMOSAIC PROCESSING UNIT
146 NR UNIT
148, 150, 540 OUTPUT UNIT
160 CONTROL UNIT
300 LIGHT RECEIVING SURFACE (PIXEL ARRAY UNIT)
302, 302a UNIT
304 PIXEL
310 SEMICONDUCTOR SUBSTRATE
332 VERTICAL DRIVE CIRCUIT UNIT
334 COLUMN SIGNAL PROCESSING CIRCUIT UNIT
336 HORIZONTAL DRIVE CIRCUIT UNIT
338 OUTPUT CIRCUIT UNIT
340 CONTROL CIRCUIT UNIT
342 PIXEL DRIVE WIRE
344 VERTICAL SIGNAL LINE
346 HORIZONTAL SIGNAL LINE
348 INPUT/OUTPUT TERMINAL
400 WIRING LAYER
410 FILTER
420 ON-CHIP LENS
430 SEMICONDUCTOR REGION
440 WIRE
450 INTERLAYER INSULATING FILM
500 IMAGE PROCESSING APPARATUS
510 IMAGE RECOGNITION UNIT/DATA ANALYSIS UNIT
520 STITCHING PROCESSING UNIT
530 FUSION PROCESSING UNIT
600 SERVER
900 HARDWARE
901 CPU
902 ROM
903 RAM
904 BRIDGE
904a HOST BUS
904b EXTERNAL BUS
905 COMMUNICATION INTERFACE
906 INPUT DEVICE
907 OUTPUT DEVICE
908 STORAGE
909 DRIVE
911 CONNECTION PORT
913 COMMUNICATION DEVICE
915 NETWORK
920 UNMANNED FLYING OBJECT
930 PROPELLER
932 PROPELLER DRIVE UNIT
934 FLIGHT CONTROL UNIT
940 POSITIONING UNIT
942 POSTURE DETECTION UNIT
944 GPS UNIT
946 ALTIMETER
950 FLIGHT CONTROL COMMUNICATION UNIT
960 FRONT SURFACE

The invention claimed is:

1. An imaging device comprising:
a pixel array including a plurality of pixels arrayed in a row direction and a column direction, the plurality of pixels including five or more types in which wavelength bands of detectable light are different in stages, wherein
the plurality of pixels are arrayed such that, at points having any spatial phases on the pixel array, mixed spectral characteristics obtained by mixing spectral characteristics of a predetermined number of pixels around the points are substantially same, and
the plurality of pixels are arranged such that an evaluation function indicated by a following Formula (1) is minimized:

$$eval = \frac{\sum_i RMSE(Y_{mean,\lambda}, Y_{i,\lambda})}{N_i} \quad (1)$$

$$RMSE(Y_{mean,\lambda}, Y_{i,\lambda}) = \sqrt{\frac{1}{N_\lambda} \sum_\lambda (Y_{mean,\lambda} - Y_{i,\lambda})^2}$$

$N_i$: Number of phases, $N_\lambda$: Number of wavelength bands
$Y_{i,\lambda}$: Mixed spectral characteristic of i-th phase
$Y_{mean,\lambda}$: Average value of mixed spectral characteristics of all phases.

2. The imaging device according to claim 1, wherein the mixed spectral characteristics are substantially the same at the points separated from one another by a predetermined number of pixels in the pixel array.

3. The imaging device according to claim 2, wherein
the points are separated from one another by a single one of the pixels in the pixel array, and
the mixed spectral characteristics are obtained by mixing the spectral characteristics of four of the pixels respectively surrounding the points.

4. The imaging device according to claim 1, wherein, in the pixel array, the pixels that detect light in wavelength bands not adjacent to one another are arranged to be adjacent in the row direction and the column direction.

5. The imaging device according to claim 1, wherein, in the pixel array, the pixels that detect light in wavelength bands adjacent to one another are arranged not to be adjacent in the row direction and the column direction.

6. The imaging device according to claim 1, wherein the pixel array is configured by arraying, in the row direction and the column direction, unit regions including the plurality of pixels arrayed in m rows and n columns.

7. The imaging device according to claim 1, further comprising
a signal processing unit that acquires a pixel signal from each of the plurality of pixels and generates image data based on the acquired pixel signal, wherein
the signal processing unit mixes the pixel signals obtained from each of the predetermined number of pixels surrounding the points and generates the image data from the mixed pixel signal.

8. The imaging device according to claim 7, further comprising a stitching processing unit that acquires a plurality of the image data and performs processing for joining the image data to one another.

9. The imaging device according to claim 7, further comprising a fusion processing unit that acquires the image data and image data from another sensor and performs fusion processing.

10. The imaging device according to claim 7, further comprising an image recognition unit that acquires the image data and performs image recognition.

11. The imaging device according to claim 7, further comprising an analysis unit that acquires and analyzes the image data.

12. Electronic equipment including the imaging device according to claim 1.

13. An imaging device comprising:
a pixel array including a plurality of pixels arrayed in a row direction and a column direction, the plurality of pixels including five or more types in which wavelength bands of detectable light are different in stages, wherein
the plurality of pixels are arrayed such that, at points having any spatial phases on the pixel array, mixed spectral characteristics obtained by mixing spectral characteristics of a predetermined number of pixels around the points are substantially same; and
a signal processing unit that acquires a pixel signal from each of the plurality of pixels and generates image data based on the acquired pixel signal, wherein
the signal processing unit mixes the pixel signals obtained from each of the predetermined number of pixels surrounding the points and generates the image data from the mixed pixel signal, and
the signal processing unit adjusts, based on a difference among the mixed spectral characteristics of the points, a mixing ratio of the pixel signals obtained from each of the predetermined number of pixels surrounding the points.

14. The imaging device according to claim 13, wherein the signal processing unit performs spatial filtering according to a difference between signal levels of the pixel signals mixed to correspond to the points.

15. The imaging device according to claim 14, wherein the signal processing unit adjusts characteristics/intensity of the spatial filtering according to a spatial frequency characteristic of the image data.

16. The imaging device according to claim 14, wherein the signal processing unit adjusts characteristics/intensity of the spatial filtering according to a spectral characteristic of a light source that irradiates a subject with light or the subject.

17. The imaging device according to claim 13, wherein the signal processing unit adjusts a gain of the mixed pixel signal according to a difference among signal levels of the pixel signals mixed to correspond to the points.

18. The imaging device according to claim 17, wherein the signal processing unit adjusts the gain according to a spectral characteristic of a light source that irradiates a subject with light or the subject.

19. Electronic equipment including the imaging device according to claim 13.

20. An imaging device comprising:
a pixel array including a plurality of pixels arrayed in a row direction and a column direction, the plurality of pixels including five or more types in which wavelength bands of detectable light are different in stages, wherein
the plurality of pixels are arrayed such that, at points having any spatial phases on the pixel array, mixed spectral characteristics obtained by mixing spectral characteristics of a predetermined number of pixels around the points are substantially same; and
a signal processing unit that acquires a pixel signal from each of the plurality of pixels and generates image data based on the acquired pixel signal, wherein
the signal processing unit mixes the pixel signals obtained from each of the predetermined number of pixels surrounding the points and generates the image data from the mixed pixel signal, and
the signal processing unit selects the plurality of pixels to be used in generation of the image data based on a subject, an imaging condition, or a desired resolution.

* * * * *